US005745167A

United States Patent [19]
Kageyu et al.

[11] Patent Number: 5,745,167
[45] Date of Patent: Apr. 28, 1998

[54] VIDEO MONITOR SYSTEM

[75] Inventors: Satoshi Kageyu, Fujisawa; Akino Inoue, Kawasaki; Masaki Sohma, Yokohama; Hitoshi Kato, Tokyo, all of Japan

[73] Assignee: Matsushita Electric Industrial Co., Ltd., Japan

[21] Appl. No.: 661,783

[22] Filed: Jun. 13, 1996

[30] Foreign Application Priority Data

Jun. 13, 1995 [JP] Japan ................................. 7-169347

[51] Int. Cl.⁶ ......................................................... H04N 7/18
[52] U.S. Cl. ......................................... 348/153; 348/159
[58] Field of Search .................................... 348/153, 154, 348/159, 143, 150, 151, 152, 155

[56] References Cited

U.S. PATENT DOCUMENTS

| | | | |
|---|---|---|---|
| 4,511,886 | 4/1985 | Rodriquez | 348/154 |
| 4,673,974 | 6/1987 | Ito et al. | 348/159 |
| 4,814,869 | 3/1989 | Oliver, Jr. | 358/108 |
| 4,943,854 | 7/1990 | Shiota et al. | 348/159 |
| 4,997,449 | 3/1991 | Morgan | |
| 5,229,850 | 7/1993 | Toyoshima | 348/153 |
| 5,335,014 | 8/1994 | Elberbaum | 348/159 |

FOREIGN PATENT DOCUMENTS 6-178301  6/1994  Japan .

Primary Examiner—Amelia Au
Attorney, Agent, or Firm—Rossi & Associates

[57] ABSTRACT

A video monitor system comprises a transmitting medium, video cameras, monitors, VTR, monitor terminals, a control portion and a transmitting medium having channels of video signals and a data channel coupling these units. The video monitor receives a request of a desired camera and a desired monitor and supplies the data indicative the request. The control portion receives the data indicative of the request and determines one of channels and operates the desired camera and desired monitor thorough the determined one of channels to display a video signal on the desired monitor. The VTR records one of video signals from a desired video camera through determined one of channels. A priority is judged to control one video camera which are requested to be operated by two monitor control terminals at the same time. A diagnostic function for detecting a defect and a location in the transmitting medium and a sequential operation function are also provided. The control portion operates in two modes which can be alternately executed by storing conditional data of two modes. An integrated video monitor system having two video monitor systems mentioned above and a center monitor for displaying a video signal from either of one of video camera of either of the monitor systems is also disclosed.

21 Claims, 35 Drawing Sheets

FIG. 9

| KIND | ADDRESS | KIND & ADDRESS OF NEIGHBOUR MODEM | | RESPONSE |
|---|---|---|---|---|
| CAMERA | A1 | CAMERA — | CAMERA A2 | ABSENT |
| CAMERA | A2 | CAMERA A1 | CAMERA A3 | ABSENT |
| CAMERA | A3 | CAMERA A2 | CAMERA A4 | PRESENT |
| CAMERA | A4 | CAMERA A3 | CAMERA A5 | PRESENT |
| ⋮ | ⋮ | ⋮ | ⋮ | ⋮ |
| CAMERA | A200 | CAMERA A198 | MONITOR A202 | PRESENT |
| MONITOR | A201 | MONITOR A202 | MONITOR A203 | PRESENT |
| MONITOR | A202 | CAMERA A200 | MONITOR A201 | PRESENT |
| ⋮ | ⋮ | ⋮ | ⋮ | ⋮ |
| MONITOR | A214 | MONITOR A213 | TERM A217 | PRESENT |
| MONITOR | A215 | TERM A220 | MONITOR A216 | PRESENT |
| MONITOR | A216 | MONITOR A215 | SERVER A221 | PRESENT |

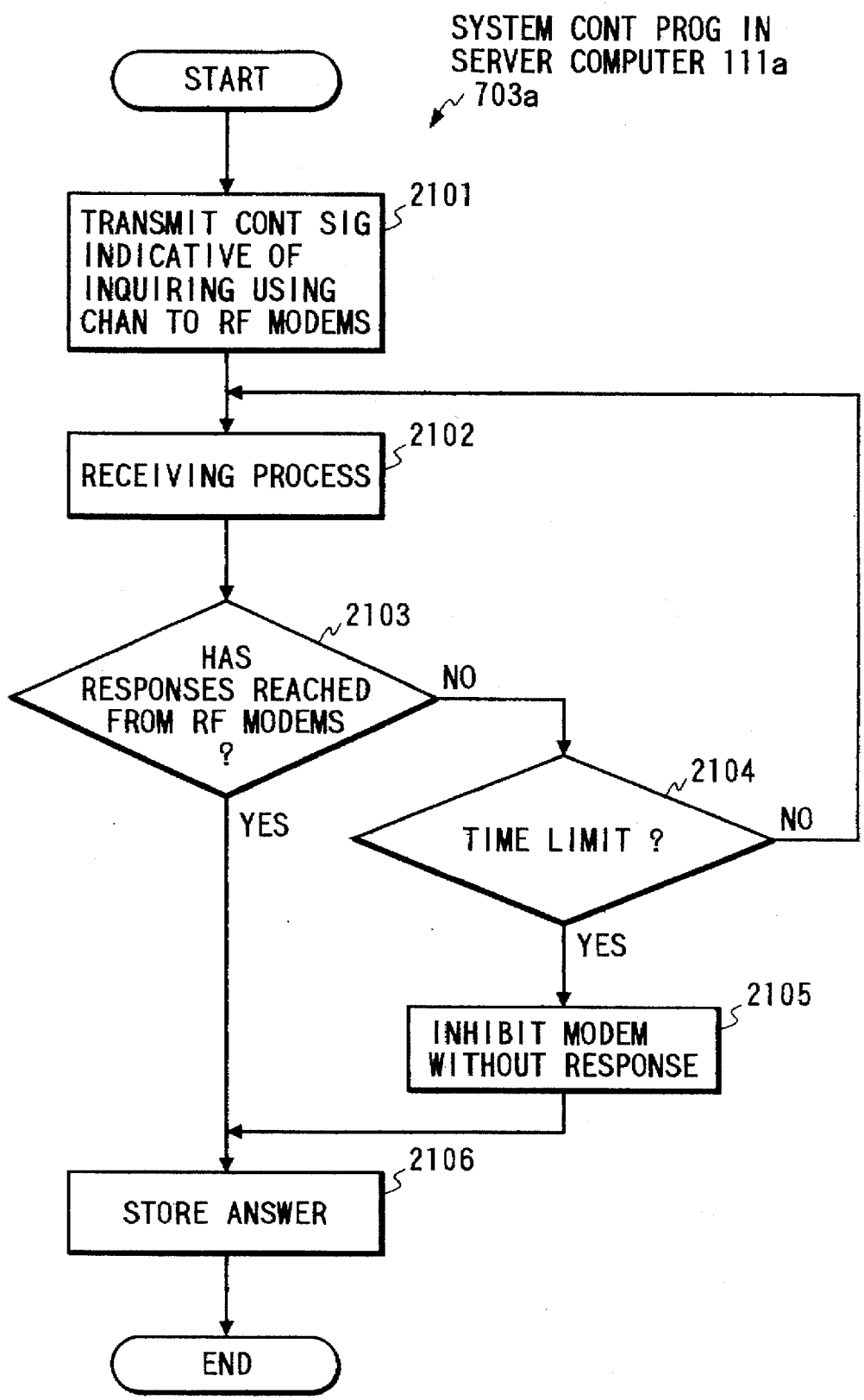

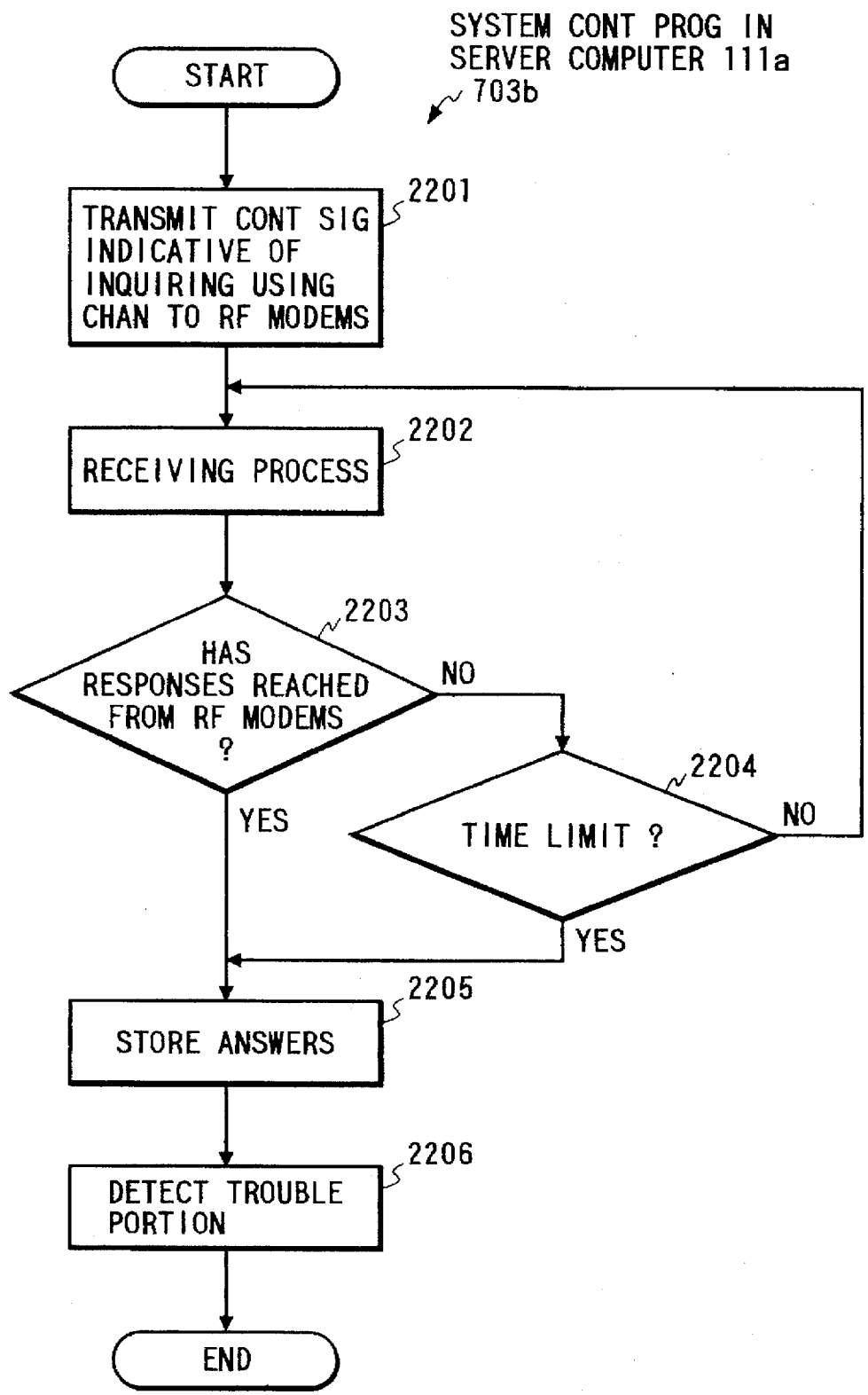

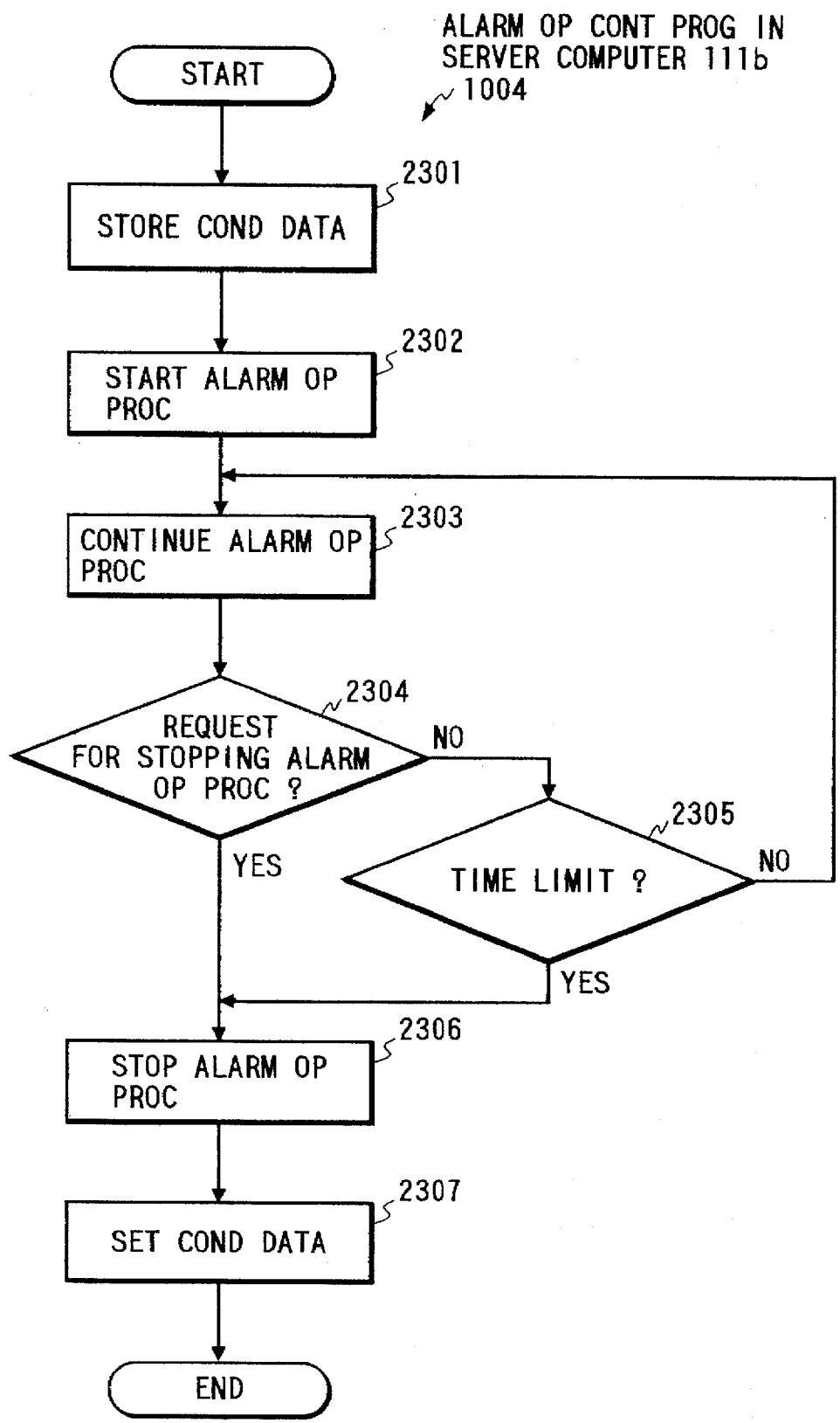

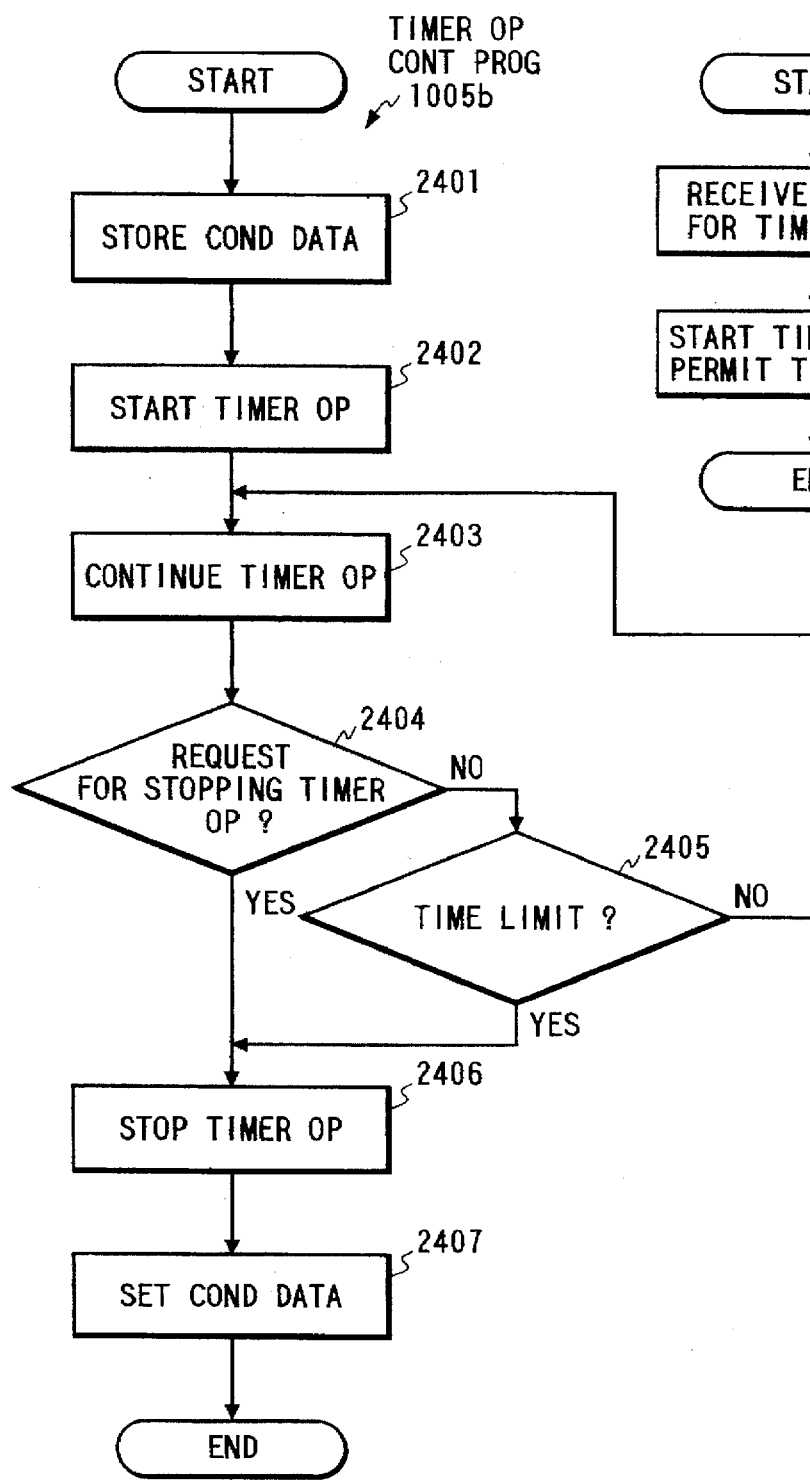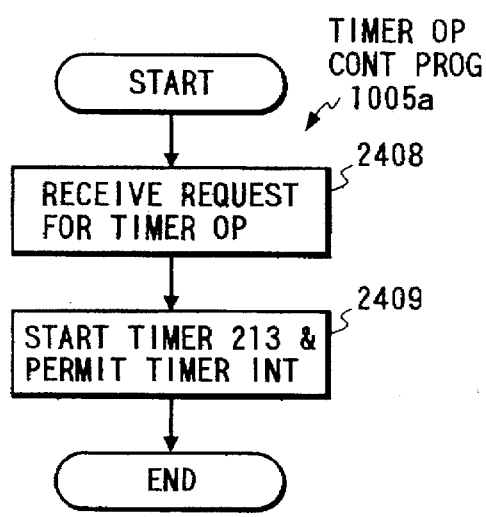

VIDEO MONITOR SYSTEM

BACKGROUND OF THE INVENTION

1. Field of the Invention

This invention relates to a video monitor system having at least a video signal source and at least a monitor for providing a video image from the video signal source on the monitor and particularly relates to a video monitor system at least a video camera and at least a monitor for providing a video image from the video camera on the monitor.

2. Description of the Prior Art

A video monitor system having a plurality of video cameras for generating a plurality of video signals, a coaxial cable, a plurality of modulators for modulating the video signals to provide respective fixed channels of video signals and combining units for multiplexing a plurality of video signals on the coaxial cable, a plurality of distributors and demodulators for selectively receiving video signals respectively, a plurality of television monitors for displaying the received video signals respectively is known.

FIG. 15 is a block diagram of a prior art video monitor system disclosed in Japanese patent application provisional publication No. 5-7330. This prior art video monitor system comprises a coaxial cable 1501 for transmitting multiplexed video signals, a plurality of cameras 1502-1 to 1502-10 for generating video signals respectively, modulators 1503-1 to 1503-10 for modulating a the video signals having fixed frequencies respectively, combining units (combiners) 1504- to 1504-10 for multiplexing the modulated video signals on the coaxial cable 1501, distributors 1507-1 to 1507-4 for distributing the multiplexed video signals, demodulators for selectively demodulating the multiplexed video signals having predetermined frequencies respectively, and video monitors 1505-1 to 1505-4 for displaying the video signals respectively.

In this system, the modulators 1503-1 to 1503-10 modulate video signals supplied from the video cameras 1502-1 to 1502-10 at predetermined different frequencies. The combining units 1504-1 to 1504 10 multiplex the modulated video signals on the coaxial cable 1501. On the monitor side, the distributors 1507-1 to 1507-4 distributes the multiplexed video signals respectively. The demodulator selectively demodulate the multiplexed video signals with different predetermined frequencies respectively. The video monitors 1505-1 to 1505-4 display the video signals to reproduce different images respectively.

An operator can selectively display an image from either of video cameras 1502-1 to 1502-10 on each video monitor by controlling the demodulation frequency.

SUMMARY OF THE INVENTION

The aim of the present invention is to provide an improved video monitor system.

According to this invention, a first video monitor system is provided which comprises: a transmitting medium, having L channels of L video signals, for transmitting the L video signals and data; a video signal source portion including: M video signal source units, each of the M video signal source units receiving the data from the transmission medium and selectively generating and supplying one of the L video signals to the transmission medium through one of the L channels in accordance with the data; a monitor portion including; N monitor units, each of the N monitor units receiving the data from the transmission medium and selectively receiving and reproducing one of the L video signals from one of the L channels in accordance with the data, the L, M, and N being natural numbers more than one; a monitor control portion including; a plurality of monitor control terminals, each of the monitor control terminals in response to a request, generating and transmitting the data indicating which one of the M video signal sources is requested to be operated and the data indicating which one of the N monitor units is requested to be operated to the transmitting medium; and a control portion including: a receiving circuit for receiving the data from the monitor control portion via the transmission medium; a channel condition detection portion responsive to the data indicating which one of the M video signal sources is requested to be operated and the data indicating which one of the N monitor units is requested to be operated for detecting a condition of the L channels; a determining portion responsive to the channel condition detection portion for determining which one of the L channels is used in accordance with the detected condition of the L channels; an operating portion, responsive to the data indicating which one of the M video signal sources is requested to be operated and the data indicating which one of the N monitor units is requested to be operated, for operating one of M video signal sources indicated by the data from the monitor control terminal portion to supply one of L video signals using the determined one of L channels and operating one of the N monitor units indicated by the data from the monitor control terminal portion to receive and reproduce one of L video signals from the determined one of L channels through generating and transmitting the data to the transmitting medium.

In the first video monitor system, the M video source units, the N monitor units, and the monitor control terminals may have addresses respectively and the control portion transmits the data directed to the more than one of the addresses at once.

The first video monitor system may further comprise a synchronizing signal generation circuit for generating a synchronizing signal, wherein the transmitting medium further transmits the synchronizing signal and the M video source units and N monitor units further comprise synchronizing signal receiving circuits respectively, each of the M video signal source units selectively generates and supplies one of the L video signals to the transmission medium in response to the synchronizing signal from the synchronizing receiving circuit, and each of the N monitor units selectively receives one of the L video signals in response to the synchronizing signal from the synchronizing receiving circuit thereof.

In the first video monitor system, each of the monitor control terminals may further comprise first generating and transmitting portion responsive to a acquiring request for generating the data indicative of acquiring a right of controlling a desired one of the M video signal sources to the control portion and second generating and transmitting portion responsive to a releasing request for generating the data indicative of releasing the right of controlling the desired one of the M video signal sources to the control portion, the control portion further includes a priority data storing portion for storing priority data of the M video signal sources and a judging portion for, when the receiving circuit of the control portion receives the data indicative of acquiring the right of controlling the desired one of the M video signal sources from one of the N monitor terminal in the case that the receiving circuit of the control portion has received the data indicative of acquiring the right of controlling the desired one of the M video signal sources from another one of the N monitor control terminals and has not received the data indicative of releasing the right from another one of the N monitor control terminal, judging which one of one or the another one of the N monitor control terminals has a higher priority in accordance with the priority data, and transmits the data indicative of providing the right of controlling the desired one of the M video signal sources to either one of the N monitor control terminals which has been judged to have the higher priority.

The first video monitor system may further comprises a recording portion for receiving the data from the generating portion through transmission medium and selectively receiving and recording one of the L video signals using one of the L channels in accordance with the data, wherein the control portion may further comprise a recording operation portion responsive to data indicative of the recording request and the determining portion for operating one of the M video signal sources using the determined one of the L channel in accordance with the data indicative of the recording request. In this case, it further comprises a synchronizing signal generation circuit for generating a synchronizing signal, wherein the transmitting medium transmits the synchronizing signal and the recording portion has a synchronizing signal receiving circuit for receiving the synchronizing signal and the recording portion recording the received one of the L video signal in response to the synchronizing signal from the synchronizing signal receiving portion.

In the first video monitor system, the L<M.

In the first video monitor system, the L<N.

In a second video monitor system, the M video signal sources in the first video monitor system comprises video camera for taking a picture and generating the video signal in accordance with a picture and the other structure is the same as the first video monitor system.

In the second video monitor system, the control portion may further comprise a generating portion response to a response request command for generating the data indicative of the response requesting command, the transmitting portion transmits the data indicative of the response requesting command to at least one of the M video signal sources and the N monitor terminals and the at least one of the M video signal sources and the N monitor terminals receives the data indicative of the response requesting command and generates and transmits the data indicative of the response responsive to the response requesting command to the control portion, and the control portion further comprises a judging portion for judging a condition of the transmitting medium from the data indicative of the response received by the receiving circuit.

In the second video monitor system, the M video sources and the N monitor units may have addresses respectively and the control portion further includes an address storing portion for storing address data of the M video sources and the N monitor units, the at least one of the M video signal sources and the N monitor terminals receiving the data indicative of the response requesting command generates and transmits the data indicative of a response to the response requesting command with information of the address thereof to the control portion, and the judging portion further includes a detection portion for detecting a location of a defect in the transmitting medium from the address data in the address data storing portion and the information of the address in the data which could be received by the receiving circuit.

In the second video monitor system, each of M video signal sources further comprises an alarm signal detection portion for detecting an alarm signal and for generating and transmitting the data indicative of the alarm signal, the control portion further includes an alarm operation portion for executing a predetermined alarm operation in a first condition of the M video signal sources and the N monitor units in response to the data indicative of the alarm signal, a timer circuit for detecting a timing when a preset time has come, a timer operation portion for executing a predetermined timer operation in a second condition of the M video signal sources and the N monitor units in response to the timer operation portion, a condition detection and storing portion responsive to the data indicative of the alarm signal and the timer portion for detecting a condition of the M video signal sources and the N monitor units and for storing data of the condition, a completion detection portion for detecting completion of the alarm operation and predetermined timer operation, and a restoring portion responsive to the completion detection portion for operating the video signal source portion and the monitor portion in accordance with the data of the detected condition.

In the second video monitor system, the control portion further includes a sequence control portion responsive to a sequence operation request for generating and transmitting the data indicative of a sequence of operations of more than one of the M video signal sources to the more than one of the M video signal sources respectively and the N monitor units and a start timing generation portion responsive to a sequence operation start command for generating the data indicative of a start timing, and the each of M video signal sources and the N monitor units further comprises a sequence storing portion for storing the data indicative of the sequence, and the more than one of M video signal sources and the N monitor units which have received the data indicative of the sequence execute the sequence of operations when they receive the data indicative of start timing. In this case, this second video monitor system may further comprise a synchronizing signal generation circuit for generating a synchronizing signal, wherein the transmitting medium transmits the synchronizing signal and the M video source units and N monitor units have synchronizing receiving circuits respectively, and the more than one of M video signal sources and the N monitor units which have received the data indicative of the sequence execute the sequence of operations in response to the received synchronizing signal.

In the second video monitor system, the control portion further includes a conditional data storing portion for storing predetermined conditional data, a condition detection and storing portion responsive to a mode change command for detecting a condition of the M video signal sources and the N monitor units and storing data of the detected condition, a mode changing portion responsive to the detection portion for operating the video signal source portion and the monitor portion in accordance with predetermined conditional data, and a restoring portion responsive to a mode restoring command for operating the video signal source portion and the monitor portion in accordance with the data of the detected condition. In this case, the each of M video signal source units includes an alarm signal detection portion for detecting an alarm signal and transmitting the data indicative of detecting the alarm signal and the receiving circuit generates the mode change command when the data indicative of detecting an alarm signal. Similarly, in this case, the control portion further includes a timer circuit for detecting a timing when a preset time has come and the control portion generates the mode change command when the timer circuit detects the timing.

According to this invention a third video monitor system which comprises: a plurality of networks, each comprising:

a transmitting medium, having L channels for transmitting L video signals, for transmitting data; a video signal source portion including; M video signal source units, each of the video signal source units receiving the data from the transmission medium and selectively generating and supplying one of the L video signals to the transmission medium using one of the L channels in accordance with the data; a monitor portion including; N monitor units, each of the monitor units receiving the data from the transmission medium and selectively receiving and reproducing one of the L video signals from one of the L channels in accordance with the data, the L, M, and N being natural numbers more than one; a monitor control portion including; a plurality of monitor control terminals, each of the monitor control terminals in response to a request, generating and transmitting the data indicating which one of the M video signal sources is requested to be operated and which one of the N monitor units is requested to be operated to the transmitting medium; and a control portion including: a receiving circuit for receiving the data from the monitor control portion via the transmission medium; a channel control portion for detecting used and unused conditions of the L channels and storing the channel control data; a determining portion for determining which one of the L channels is used in accordance with the channel control data in response to the data from the monitor control portion via the receiving circuit; an operating portion, responsive to the data indicating which one of the M video signal sources is requested to be operated and the data indicating which one of the N monitor units is requested to be operated, for operating one of M video signal sources indicated by the data from the monitor control terminal portion to supply one of L video signals using the determined one of L channels and operating one of the N monitor units indicated by the data from the monitor control terminal portion to receive and reproduce one of L video signals from the determined one of L channels through is generating and transmitting the data to the transmitting medium; a center monitor control terminal, communicating with the control portions of the plurality of networks, for, in response to a monitoring request, determining which one of the plurality of networks is requested in accordance with the monitoring request, generating and transmitting the data indicating which one of the M video signal sources of the determined network is requested to be operated to the control portion of the determined network; and a switching portion, connected to the transmitting mediums of the plurality of networks, for selectively supplying one of the M video signals corresponding to the monitoring request from the determined network; and at least a center monitor unit for reproducing one of video signals from the switching portion.

BRIEF DESCRIPTION OF THE DRAWINGS

The object and features of the present invention will become more readily apparent from the following detailed description taken in conjunction with the accompanying drawings in which:

FIG. 9 is a diagram of an address table of the second embodiment shown in FIG. 7;

FIG. 21 is a diagram of a flow chart of the system control program of the second embodiment shown in FIG. 7

FIG. 22 is a diagram of a flow chart of the system control program of the second embodiment shown in FIG. 7;

FIG. 23 is a diagram of a flow chart of the alarm operation control program in the server computer of a third embodiment FIGS. 24A and 24B are diagrams of flow charts of the third embodiment;

The same or corresponding elements or parts are designated with like references throughout the drawings.

DETAILED DESCRIPTION OF THE INVENTION

Hereinbelow will be described a first embodiment of this invention.

Figure 1:
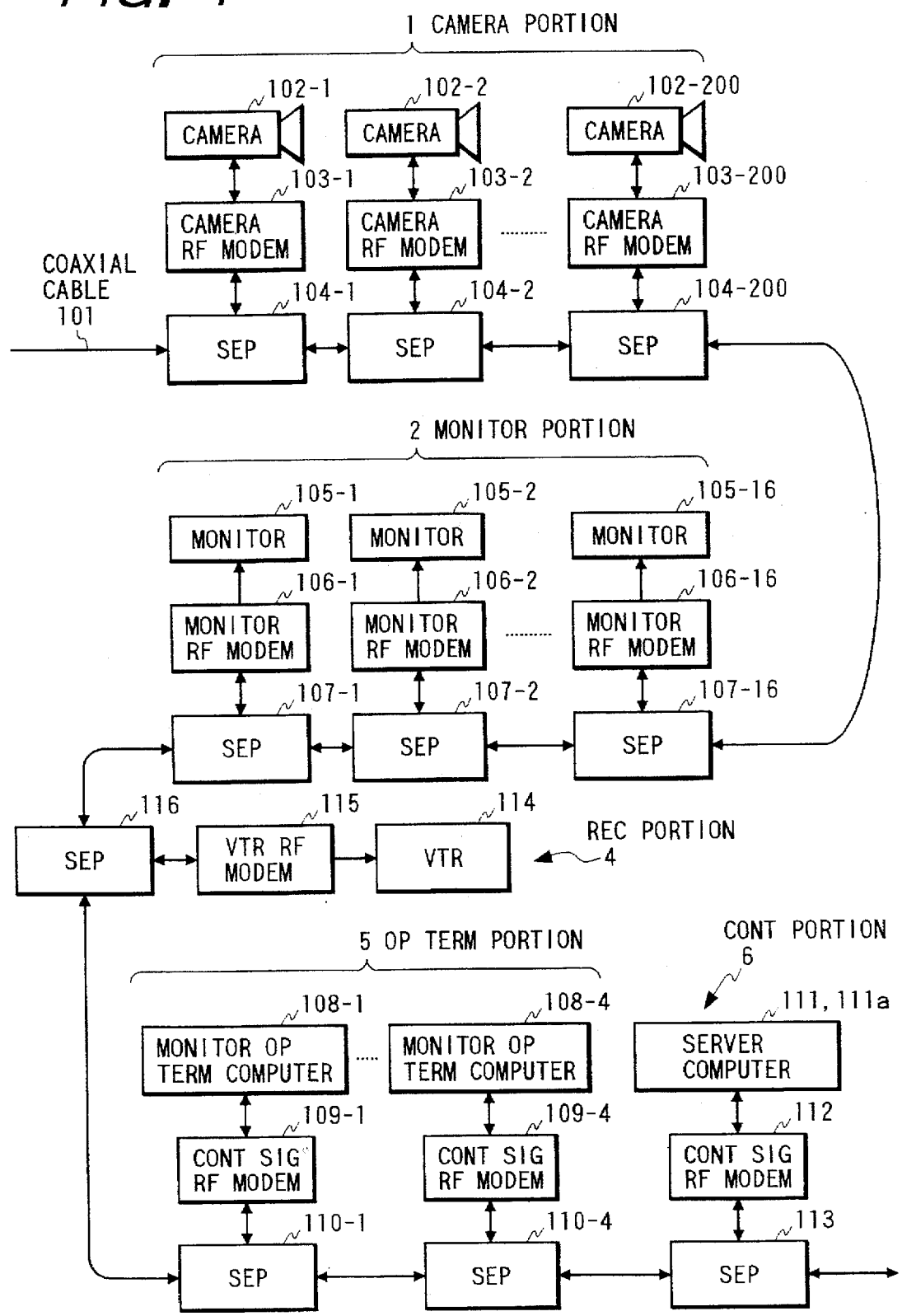
FIG. 1 is a block diagram of a video monitor system of the first to fourth embodiments.

FIG. 1 is a block diagram of a video monitor system of the first to fourth embodiments. The video monitor system of the first embodiment comprises a camera portion 1 for receiving images and generating video signals, a monitor portion 2 for monitoring video signals, a recording portion 4 for recording videos signals, an operation terminal portion 5 for generating command signals as a control signal (data), a control portion 6 for controlling this system, and a transmitting medium 101 for transmitting video signals and control signals.

The transmitting medium comprises a coaxial cable 101 for transmitting sixteen channels of video signals and control signals multiplexed.

The camera portion 1 comprises two-hundreds of video cameras 102-1 to 102-200 as video signal sources for generating video signals from received images at different locations respectively, camera RF modems 103-1 to 103-200 for modulating video signals, demodulating control signals, and receiving a synchronizing signal respectively, and bi-directional separators 104-1 to 104-200 for distributing modulated video signals, control signal and the synchronizing signal on the coaxial cable to the camera RF modems 103-1 to 103-200 and combining modulated video signals from the camera RF modems 103-1 to 103-200 with the modulated video signals, control signals, and the synchronizing signal on the coaxial cable 101.

The monitor portion 2 comprises sixteen sets of monitors 105-1 to 105-16, monitor RF modems 106-1 to 106-16, and bi-directional separators 107-1 to 107-16. The bi-directional separators 107-1 to 107-16 distribute the modulated video signals and control signals and receiving the synchronizing signal on the coaxial cable to the RF modems 103-1 to 103-200 respectively. The monitor RF modems 106-1 to 106-16 demodulate the modulated video signals, control signals, and receive the synchronizing signal on the coaxial cable 101 respectively. The monitor 105-1 to 105-16 reproduce video signals supplied from the monitor RF modems and display different images respectively.

The recording portion comprises a video tape recorder (VTR) 114, a video RF modem 115, and bi-directional separator 116. The bi-directional separator 116 distributes the modulated video signals and the control signals and receiving the synchronizing signal on the coaxial cable to the VTR RF modem 115. The VTR RF modem 115 demodulates the modulated video signals and the control signals, and receives the synchronizing signal on the coaxial cable 101. The VTR 114 records video signals supplied from the VTR RF modem on a magnetic tape (not shown) in accordance with the received control signal in response to the synchronizing signal and reproduces the video signal from the magnetic tape in accordance with the received control signal in response to the synchronizing signal. The VTR RF modem 115 modulates the reproduced video signal and transmits the reproduced video signal to the coaxial cable 101 via the bi-directional separator 116 for multiplexing.

The operation terminal portion 5 comprises bi-directional separators 110-1 to 110-4, control signal RF modems 109-1 to 109-4, monitor operation terminal computers 108-1 to 108-4. The bi-directional separators 110-1 to 110-4 distribute the control signals and receives the synchronizing signal on the coaxial cable to the control signal RF modems 109-1 to 109-4 respectively. The control signal RF modems 109-1 to 109-4 modulate the control signals including control data, and receives the synchronizing signal on the coaxial cable 101.

The control portion 6 comprises a bi-directional separator 113, a control signal RF modems 112, a server computer 111, and a synchronizing signal generation circuit 606. The synchronizing signal generation circuit 606 generates the synchronizing signal. The bi-directional separator 113 distributes the control signals from the coaxial cable 101 and supplies the synchronizing signal to the coaxial cable 101. The control signal RF modem 112 demodulates the modulated control signals including control data, and modulates control signals and transmits the synchronizing signal to the coaxial cable 101.

The camera may have a turn table mechanism (not shown) for controlling an angle of field, a focal length, and a direction of the camera in accordance with the control signal supplied from the camera RF modem 103.

Figure 2:
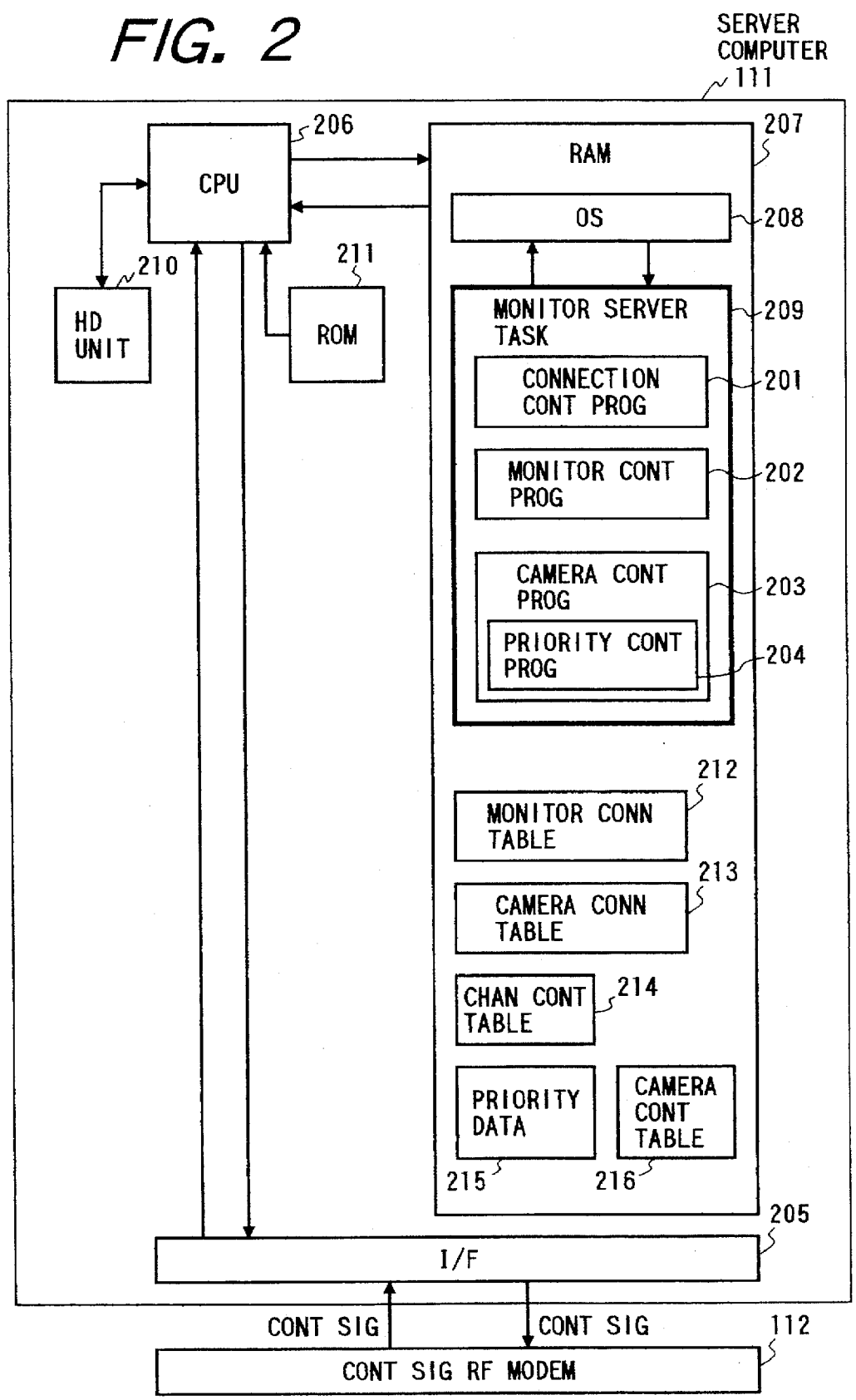
FIG. 2 is a block diagram of the sever computer in FIG. 1 of the first embodiment.

FIG. 2 is a block diagram of the sever computer 111 of the first embodiment. The server computer 111 comprises a cpu (central processing unit) 206 for executing operations defined by control programs, a ROM 211 for storing a basic control program, a RAM (random access memory) 207 for storing data and programs, a hard disc unit 210 for storing data and programs, and an interface 205, coupled to the control signal RF modem 112, for receiving and transmitting control signals including command data and control data. The hard disc unit 210 stores programs of an operation system 208, a monitor server task 209 including a connection control program 201, a monitor control program 202, a camera control program 203 including a priority control program 204. The cpu 206 transfers these programs in the hard disc unit 210 in accordance with the control program stored in the ROM 211 to the RAM 207 at an initial condition. FIG. 2 shows this condition. The connection control program 201 is for controlling acquisition conditions of video channels of the coaxial cable 101 and controlling video signal connection condition of the whole system. The monitor control program 202 is for controlling an acquisition condition of monitors 105-1 to 105-16. The camera control program 203 is for controlling providing rights of controlling through a judging in accordance with a predetermined rule when more than one monitor terminal computers request to control the same camera. The camera control program 203 includes the priority control program 204 for controlling priorities of the monitor operation terminal computers which is referred when more than one monitor terminal computers request to control the same camera.

Figure 3:
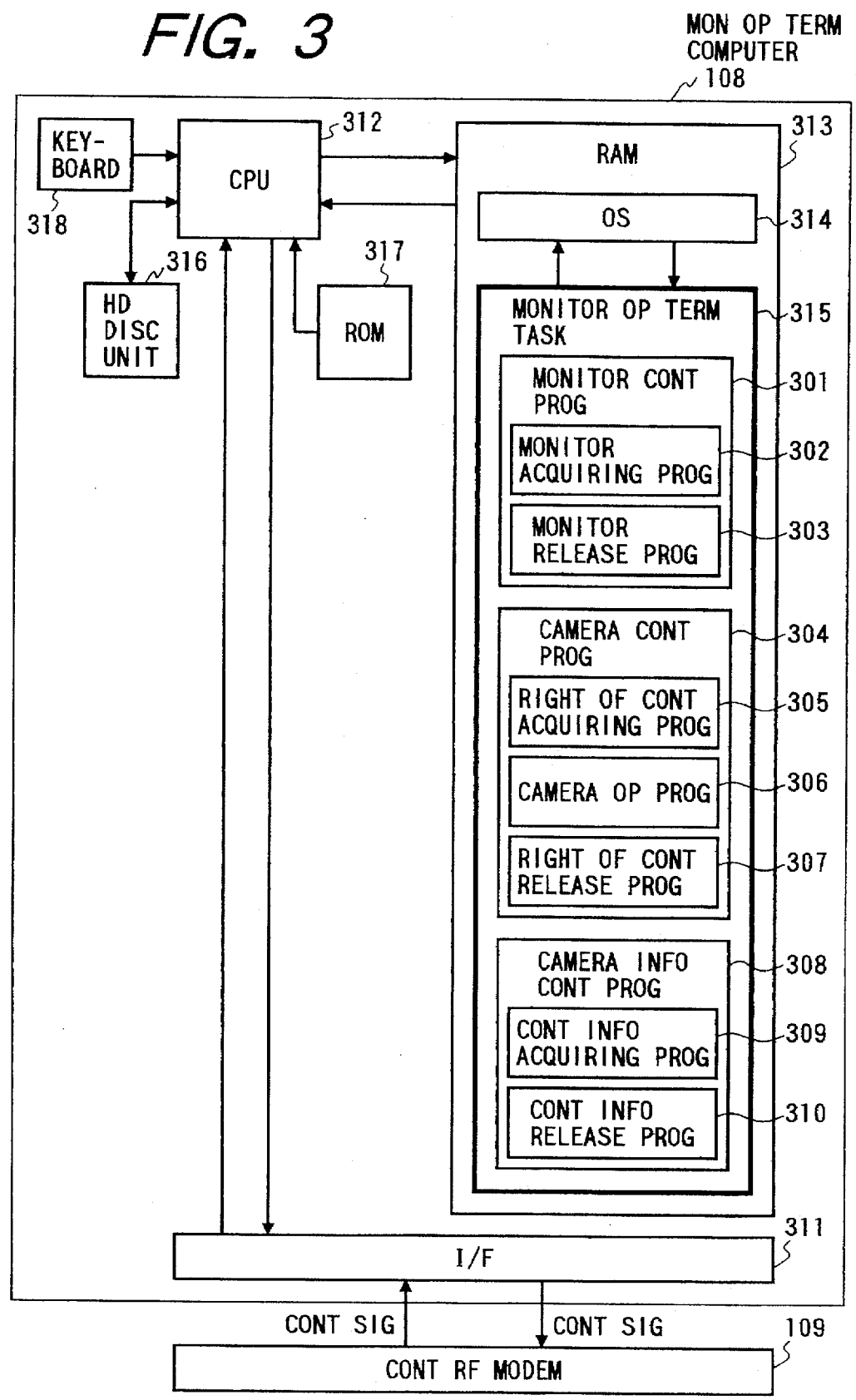
FIG. 3 is a block diagram of the monitor operation terminal computer in FIG. 1 of the embodiments of this invention.

FIG. 3 is a block diagram of the monitor operation terminal computer 108 of the embodiments of this invention.

The monitor operation terminal computer 108 comprises a cpu 312 for executing operations defined by programs, a ROM 317 for storing a basic control program, a RAM (random access memory) 313 for storing data and programs, a hard disc unit 316 for storing data and programs, and an interface 311, coupled to the control signal RF modem 109, for receiving and transmitting control signals including command data and control data. The hard disc unit 316 stores programs of the operation system 314 for effecting controlling for executing other programs, a monitor operation terminal task 315 including a monitor control program 301 for controlling monitors 105, a camera control program 304 for controlling cameras 102, and a camera information control program 308 for controlling information of a camera under acquisition.

The monitor control program includes a monitor acquiring program 302 for requesting the server computer 111 to acquire one of monitors 105 to display an image to be monitored and a monitor release program 303 for releasing the monitor acquired by the monitor acquiring program 302.

The camera control program 304 includes a right of control acquiring program 305 for requesting an acquisition of a right of controlling one of cameras to the server computer 111, a camera operation program 306 for actually operating the camera 102 through a control signal, and a right of control release program for releasing the right of controlling the camera 102 acquired by the right of controlling acquiring program 305.

The camera information control program 308 includes a control information acquiring program 309 for holding control information of the camera of which the right of controlling is acquired by the right of controlling acquiring program 305 and a control information release program 310 for releasing the control information which has been held by the control information acquiring program 309.

The cpu 312 transfers these programs in the hard disc unit 316 in accordance with the control program stored in the ROM 317 to the RAM 313 at an initial condition of this monitor operation terminal computer 108. FIG. 3 shows the condition after the transferring.

Figure 4:
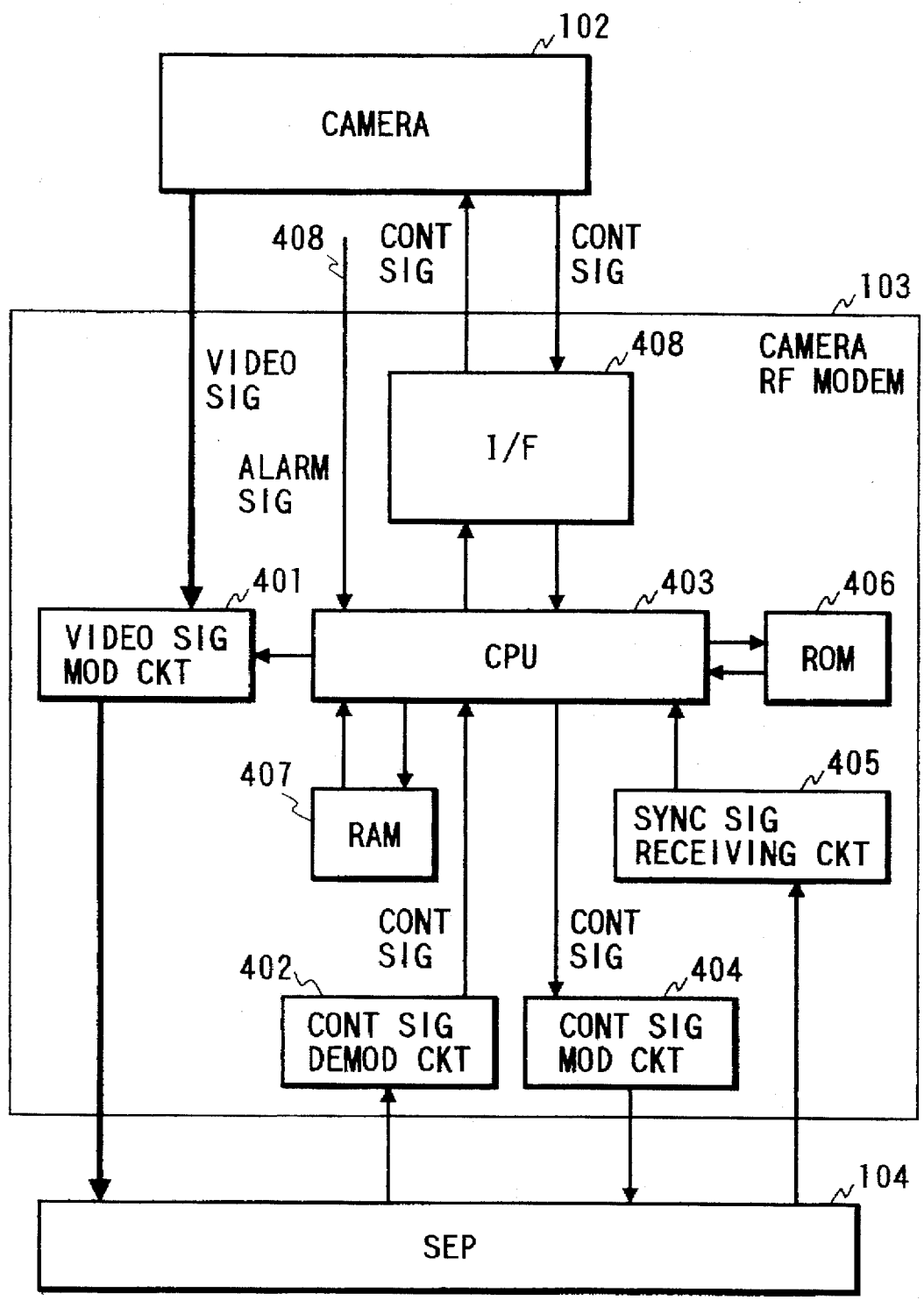
FIG. 4 is a block diagram of a set of camera including a camera, a camera RF modem, and a bi-directional separator in FIG. 1 of embodiments of this invention.

FIG. 4 is a block diagram of a set of camera including a camera 102, a camera RF modem 103, and a bi-directional separator 104 of this invention shown in FIG. 1.

The camera RF modem 103 comprises a video signal modulation circuit 401 for modulating a baseband video signal outputted from the camera 102 into an RF signal having a carrier frequency which can be changed and sends the modulated video signal to the bi-directional separator 104, a control signal demodulation circuit 402 for demodulating the control signal having a predetermined carrier frequency from the bi-directional separator 104, a cpu 403 for effecting predetermined operations in accordance with the control signal demodulated by the control signal demodulation circuit 402 and sending a control signal from the camera 102 to the coaxial cable 101, a control signal modulation circuit 404 for modulating the control signal from the cpu 403, a synchronizing signal receiving circuit 405 for receiving a synchronizing signal transmitted on the coaxial cable 101, an interface circuit (I/F) 408 for supplying and receiving the control signal from the camera 102, a ROM 406 for storing programs to be executed by the cpu 403, and a RAM 407 for storing data and programs. The cpu 403 effects the operations such as a control of turn-ON or turn OFF of the carrier signal in the video modulation circuit 401, a requesting to change the modulation frequency, and supplying the control signal to the camera 102.

The cpu 403 receives the control signal from the bi-directional separator 104, the control signal from the camera 102, and the synchronizing signal from the synchronizing signal receiving circuit 405 by interruption processings.

Figure 33:
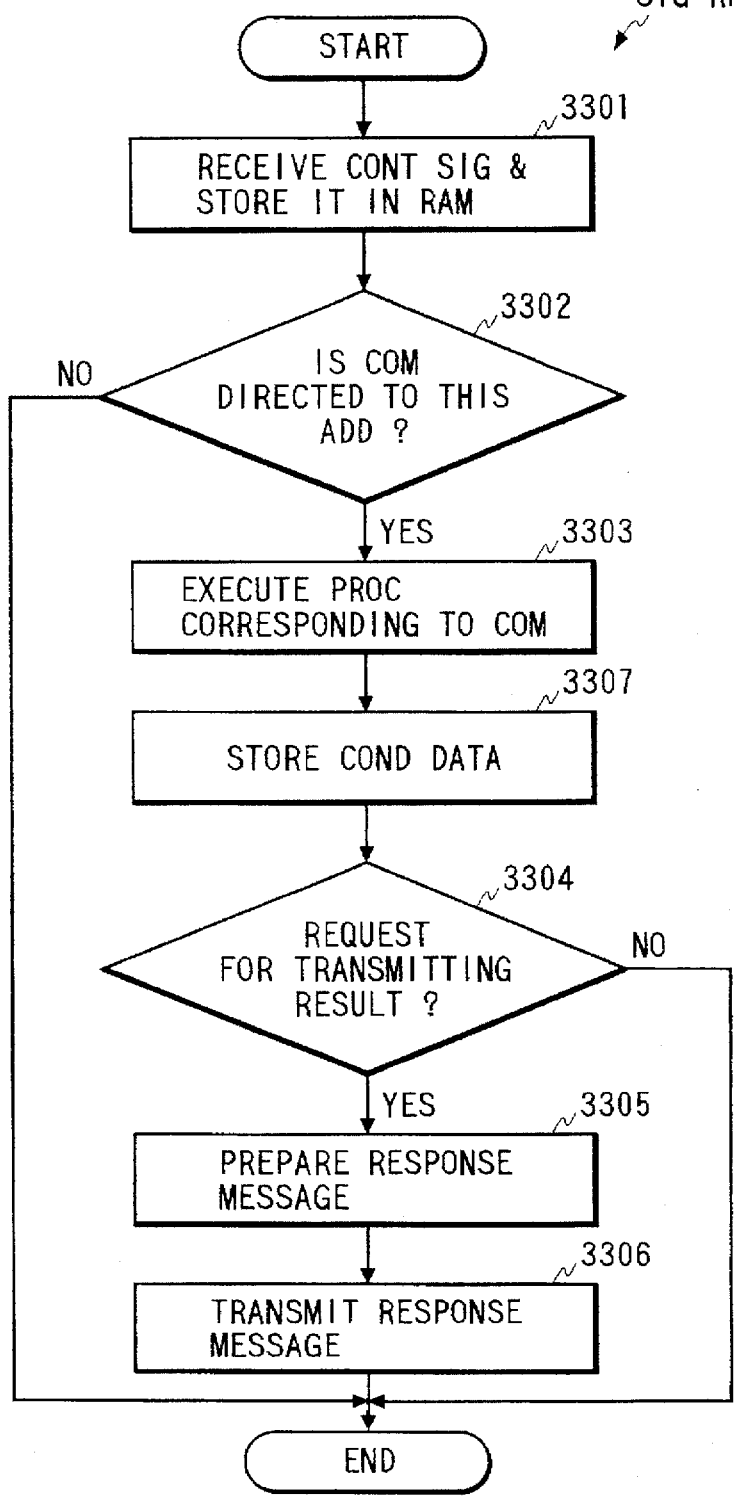
FIG. 33 is a diagram of a flow chart of the program stored in the ROMs of the respective RF modems of embodiments of this invention.

FIG. 33 is a diagram of a flow chart of the program stored in the ROMs of the respective RF modems of embodiments of this invention.

When the cpu 403 detects the control signal from the bi-directional separator 104, the cpu 403 executes a program stored in the ROM 406 as shown in FIG. 33.

The cpu 403 receives the control signal and stores it in the RAM 407 in step 3301. In step 3302, the cpu 403 checks as to whether or not a command in the control signal is directed to the camera RF modem 103 by checking an address in the control signal in step 3302. If the command is directed to the camera RF modem 103, the cpu 403 executes a corresponding processing of which program is stored in the ROM 406 in step 3303 such as a changing processing of the modulation channel and a transmission processing of a command to the camera 102. In the following step 3307 the cpu 403 stores conditional data of the camera and the video signal modulation circuit 401 such as the used channel. If the command includes a request for transmitting a result in step 3304, the cpu 403 prepares a response message corresponding to the result of execution of the processing corresponding to the command in step 3305. The cpu 403 transmits the response message to the source of the control signal requesting the result or a destination indicated in the control signal through the control signal modulator 404 in step 3306.

Figure 34:
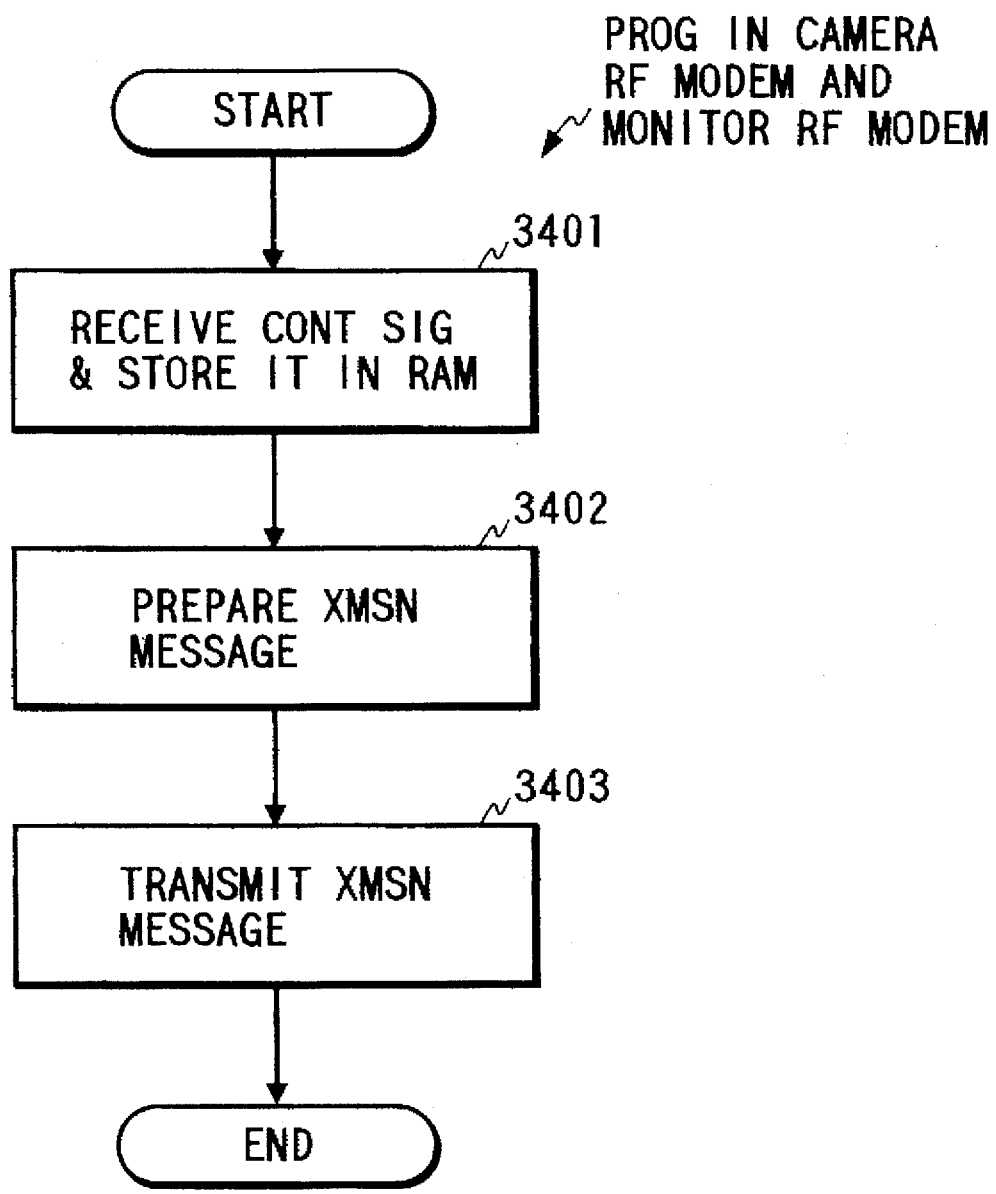
FIG. 34 is a diagram of a flow chart of a program stored in the ROMs of the camera RF modem and monitor RF modems of embodiments of this invention.

FIG. 34 is a diagram of a flow chart of a program stored in the ROMs of the camera RF modem 103 and monitor RF modems of embodiments of this invention.

When the cpu 403 receives the control signal from the camera 102, the cpu 403 executes the program stored in the ROM 406 as shown in FIG. 34. The cpu 406 receives the control signal from the camera 102 and stores it in the RAM 407 in step 3401. The cpu 403 prepares a transmission message by adding address data of destination to the stored control signal in step 3402. In the following step 3403, the cpu 403 transmits the transmission message through the control signal modulation circuit 404.

The synchronizing signal received by the synchronizing signal receiving circuit 405 is used in the cpu 403 during a synchronizing operation.

Figure 5:
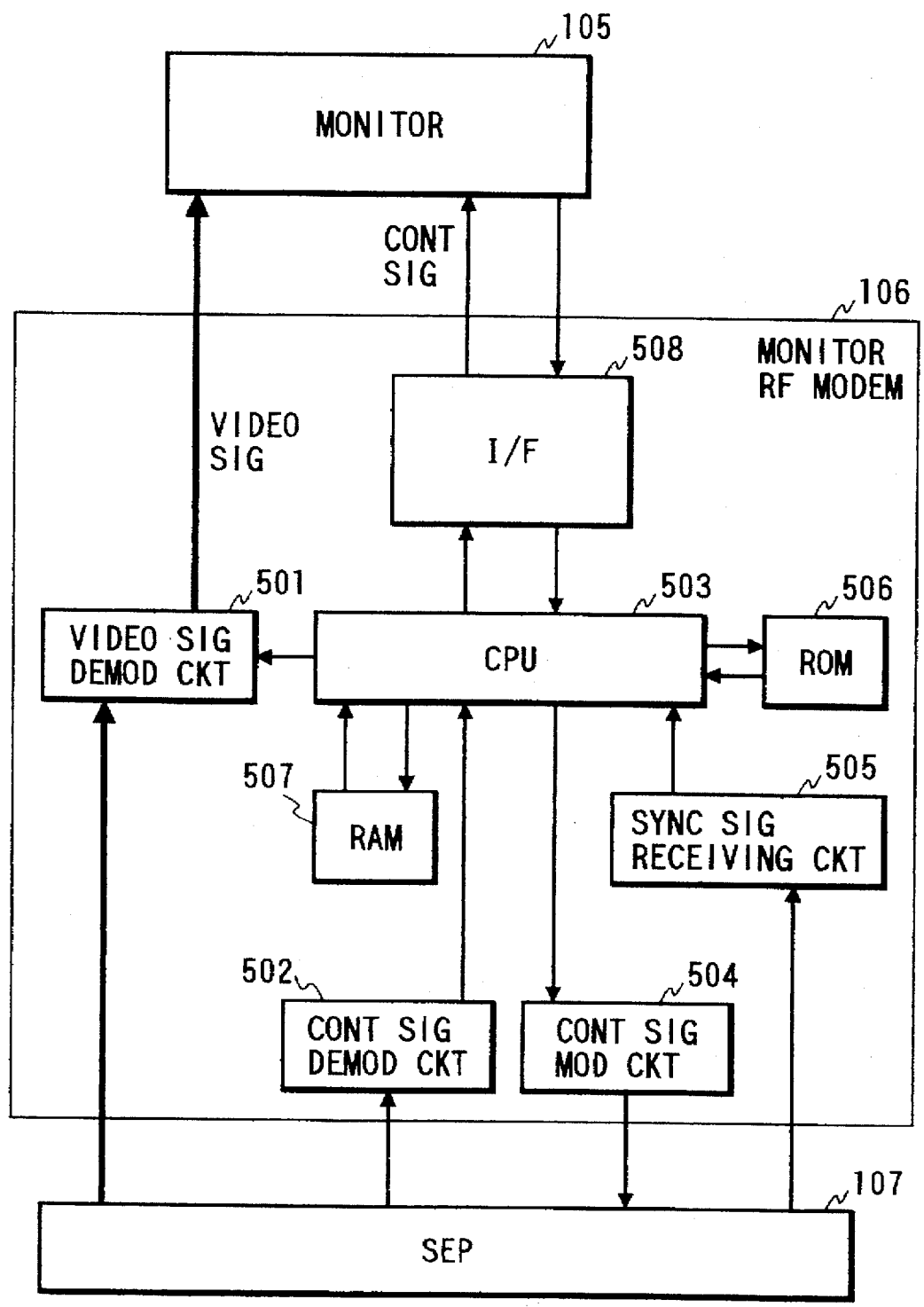
FIG. 5 is a block diagram of a set of monitor including a monitor, a monitor RF modem, and a bi-directional separator in FIG. 1 of embodiments of this invention.

FIG. 5 is a block diagram of a set of monitor including a monitor 105, a monitor RF modem 106, and a bi-directional separator 107 shown in FIG. 1 of embodiments of this invention.

The monitor RF modem 106 comprises a video signal demodulation circuit 501 for demodulating the RF video signal having a carrier frequency which can be changed into a baseband video signal and sending the demodulated video signal to the monitor 105, a control signal demodulation circuit 502 for demodulating a control signal having the predetermined carrier frequency from the bi-directional separator 107, a cpu 503 for effecting predetermined operations for the monitor RF modem in accordance with the control signal demodulated by the control signal demodulation circuit 502 and outputting a control signal from the monitor 102, a control signal modulation circuit 504, a synchronizing signal receiving circuit 505 for receiving a synchronizing signal transmitted on the coaxial cable 101, an interface circuit (I/F) 508 for interfacing between monitor 105 and cpu 503, a ROM 506 for storing a programs to be executed by the cpu 503, and a RAM 507 for storing data and programs. The cpu 503 effects the operations such as a control of turn ON or turn OFF of the carrier signal in the video demodulation circuit 501, a control of changing the demodulation frequency, and outputting the control signal to and from the monitor 105.

The cpu 503 receives the control signal from the bi-directional separator 107, the control signal from the monitor 105, and the synchronizing signal from the synchronizing signal receiving circuit 505 by interruption processings.

When the cpu 503 detects the control signal from the bi-directional separator 107, the cpu 503 executes a program stored in the ROM 506 as shown in FIG. 33 as similar to the camera monitor RF modem 103. However, processings executed in step 3303 in response to commands directed to this monitor RF modem 106 stored in the ROM 506 is such as a processing of changing demodulation channel to the video signal demodulation circuit 501 which is specially provided to the monitor RF modem 106.

Moreover, when the cpu 503 detects a control signal from the monitor 105, the cpu 503 executes the program stored in the ROM 506 as shown in FIG. 34 as similar to the camera RF modem 103.

The synchronizing signal received by the synchronizing signal receiving circuit 505 is used in the cpu 503 during a synchronizing operation.

Figure 6A:
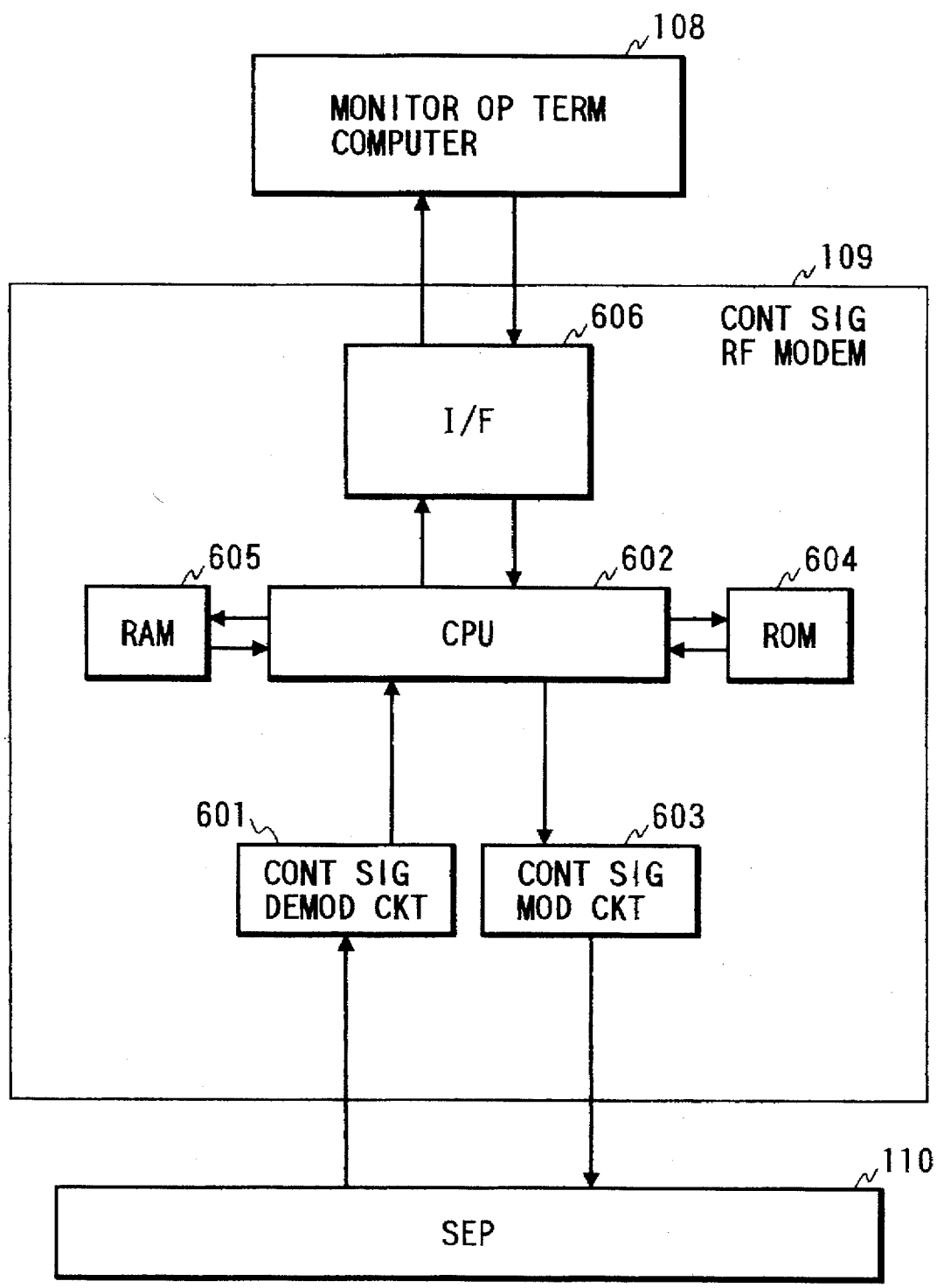
FIG. 6A is a block diagram of a set of a monitor operation terminal including a monitor operation terminal, a control signal RF modem, and a bi-directional separator in FIG. 1 of embodiments of this invention.

FIG. 6A is a block diagram of a set of a monitor operation terminal including a monitor operation terminal 108, a control signal RF modem 109, and a bi-directional separator 110 in FIG. 1 of embodiments of this invention.

The control signal RF modem 109 comprises a control signal demodulation circuit 601 for demodulating a control signal having the predetermined carrier frequency from the bi-directional separator 110, a cpu 602 for effecting predetermined operations in accordance with the control signal demodulated by the control signal demodulation circuit 601 and outputting a control signal from the monitor operation terminal computer 108, and a control signal modulation circuit 603.

Figure 6B:
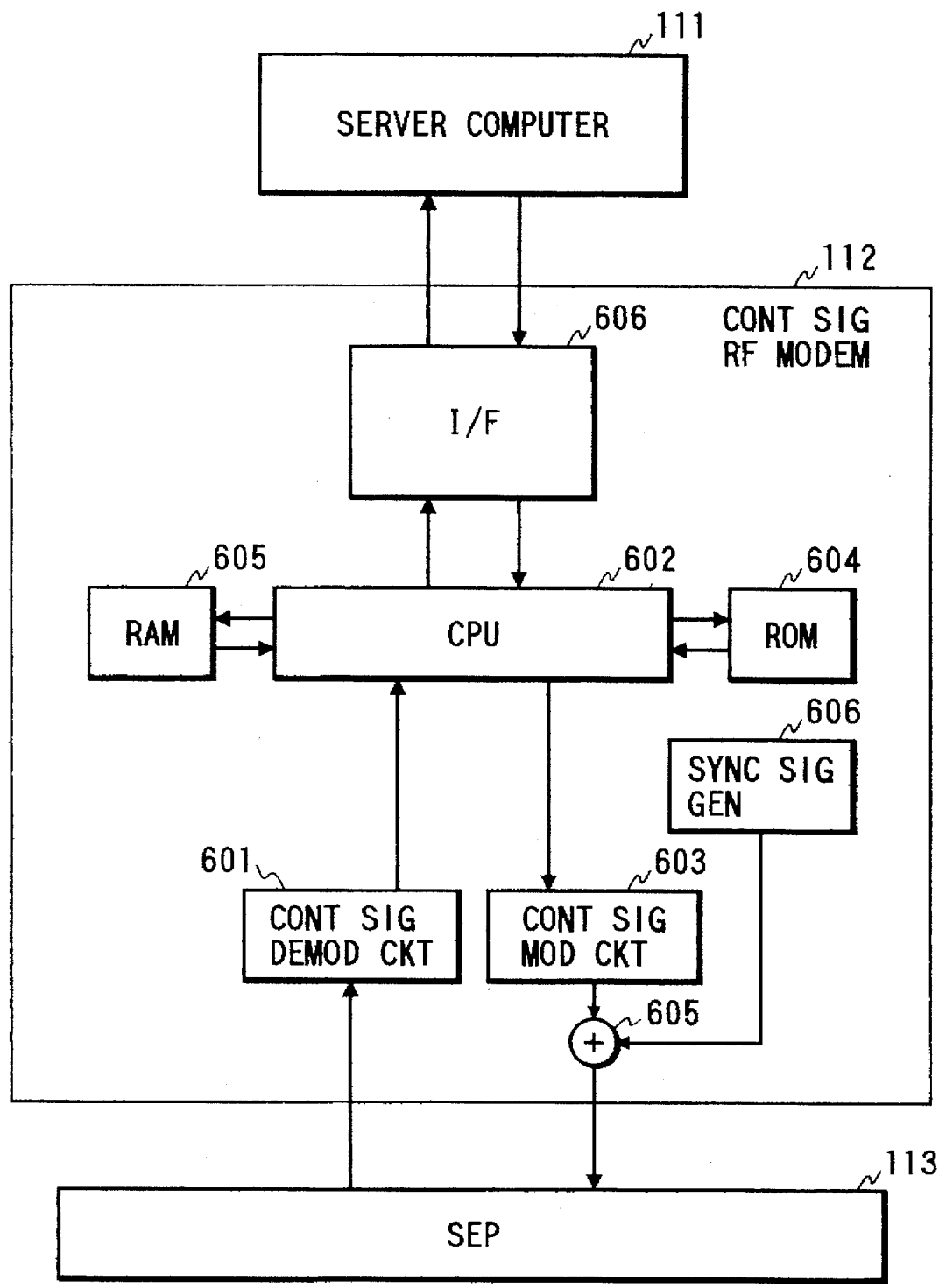
FIG. 6B is a block diagram of a set of a server including the server computer, a control signal RF modem, and a bi-directional separator in FIG. 1 of embodiments of this invention.
Figure 35:
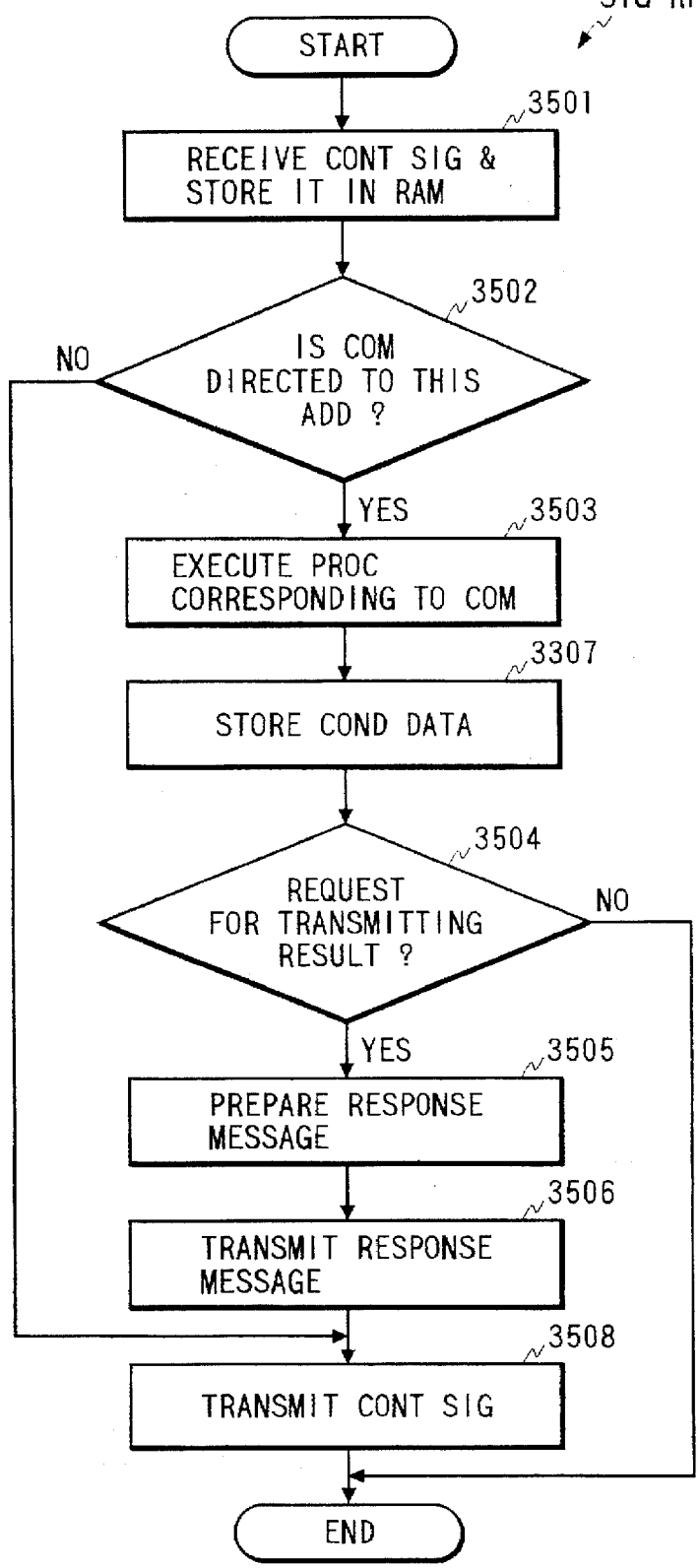
FIG. 35 is a diagram of the control signal RF modems in FIG. 1 of embodiment of this invention.

FIG. 6B is a block diagram of a set of a server including the server computer 111, a control signal RF modem 112, and a bi-directional separator 113 in FIG. 1 of embodiments of this invention. FIG. 35 is a diagram of the control signal RF modems 109 and 112 of embodiment of this invention.

The control signal RF modem 112 has substantially the same structure as the control signal RF modem 109. A difference is in that a synchronizing signal generator 606 is further provided, the bi-directional separator sends the synchronizing signal, and an adder 605 are added. The synchronizing signal generation circuit 604 generates a synchronizing signal and the adder 605 adds the synchronizing signal to the modulated supplies control signal and supplies the result to the bi-directional separator 113.

The cpu 602 receives the control signal from the bi-directional separator 110, and the control signal from the monitor operation terminal 108 by interruption processings in accordance with the program stored in the ROM 604 similar to the cpu 503 of the monitor RF modem 106 as shown in FIG. 33. However, processings executed in step 3303 in response to commands directed to this control signal RF modem 109 stored in the ROM 604 is such as a forwarding processing of a received control signal to the monitor operation terminal computer 108 or the server computer 111 which is specially provided to the control RF modem 112.

On the other hand, when the cpu 602 detects a control signal from the monitor operation terminal computer 108 or the server computer 111, the cpu 602 executes a program also stored in the ROM 604 as shown in FIG. 35 which is similar to FIG. 33 except in that step 3508 is added.

The cpu 602 receives the control signal and stores it in the RAM 605 in step 3501. In step 3502, the cpu 602 checks as to whether or not a command in the control signal is directed to this RF modem 109 or 112 by checking an address in the control signal. If the command is directed to this RF modem 109 or 112, in step 3503, the cpu 602 executes a corresponding processing of which program is stored in the ROM 604 such as a processing resetting an internal condition of the modem. If the command includes a request for transmitting a result in step 3504, the cpu 602 prepares a response message corresponding to the result of execution of the processing corresponding to the command in step 3505. The cpu 602 transmits the response message to the monitor operation terminal computer 108 or the server computer 111 using the interface 606 in step 3506.

In step 3502, when the control signal is not directed to this RF modem, the cpu 602 transmits the control signal to the coaxial cable 101 in step 3508.

Figure 16:
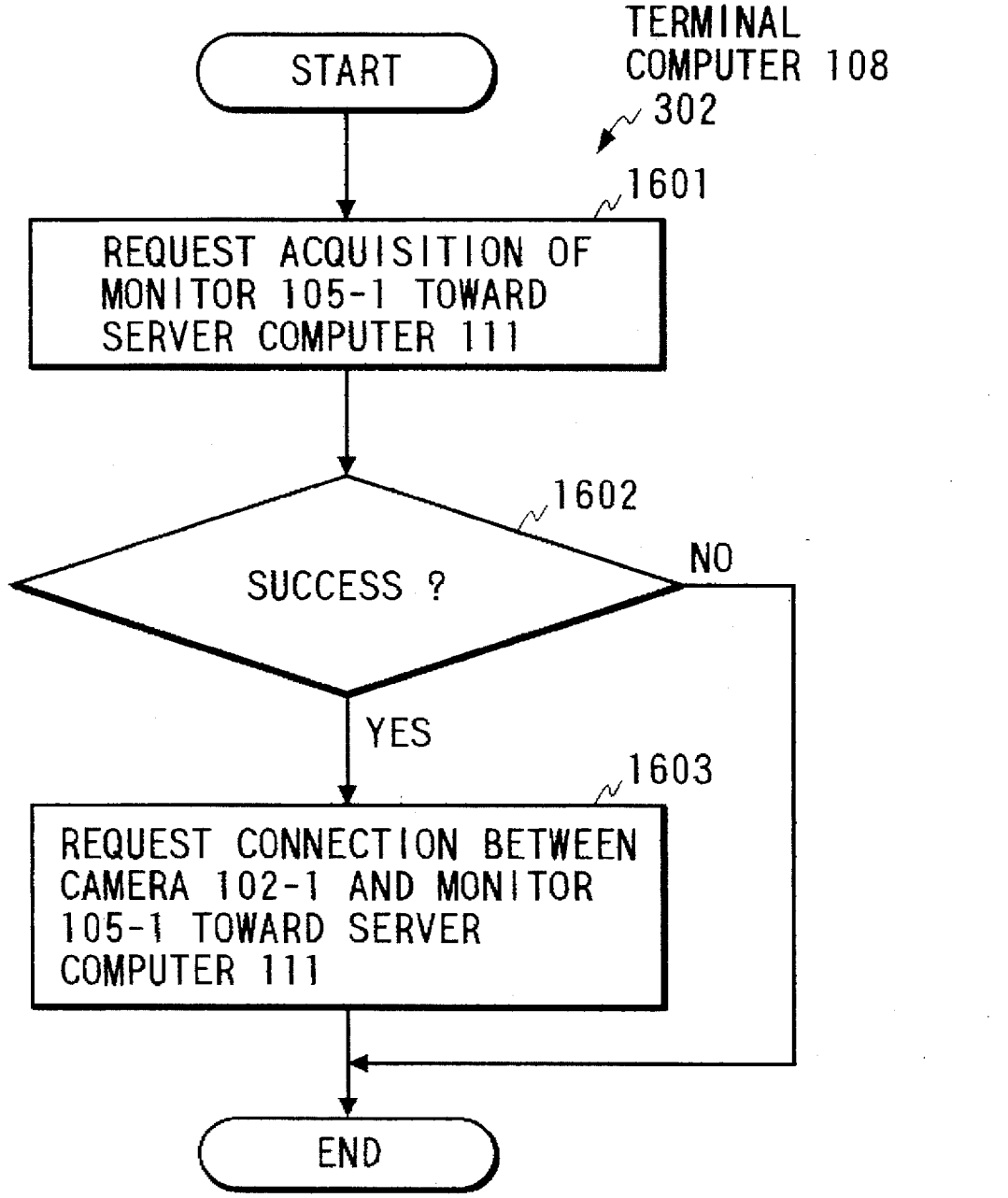
FIG. 16 is a diagram of a flow chart of monitor acquiring program of the embodiments of this invention.
Figure 17:
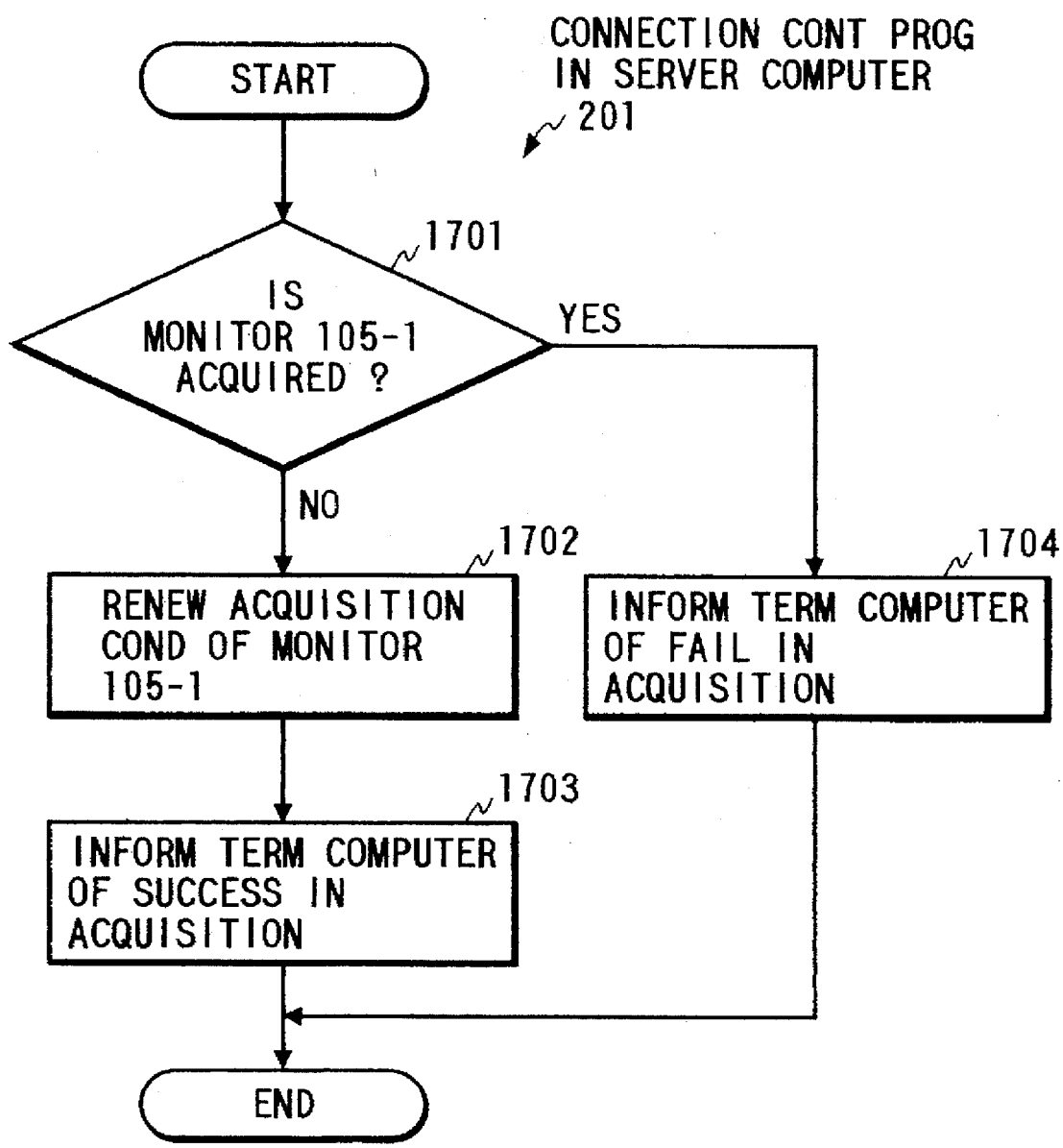
FIG. 17 is a diagram of a flow chart of the connection control program in FIG. 2.
Figure 18:
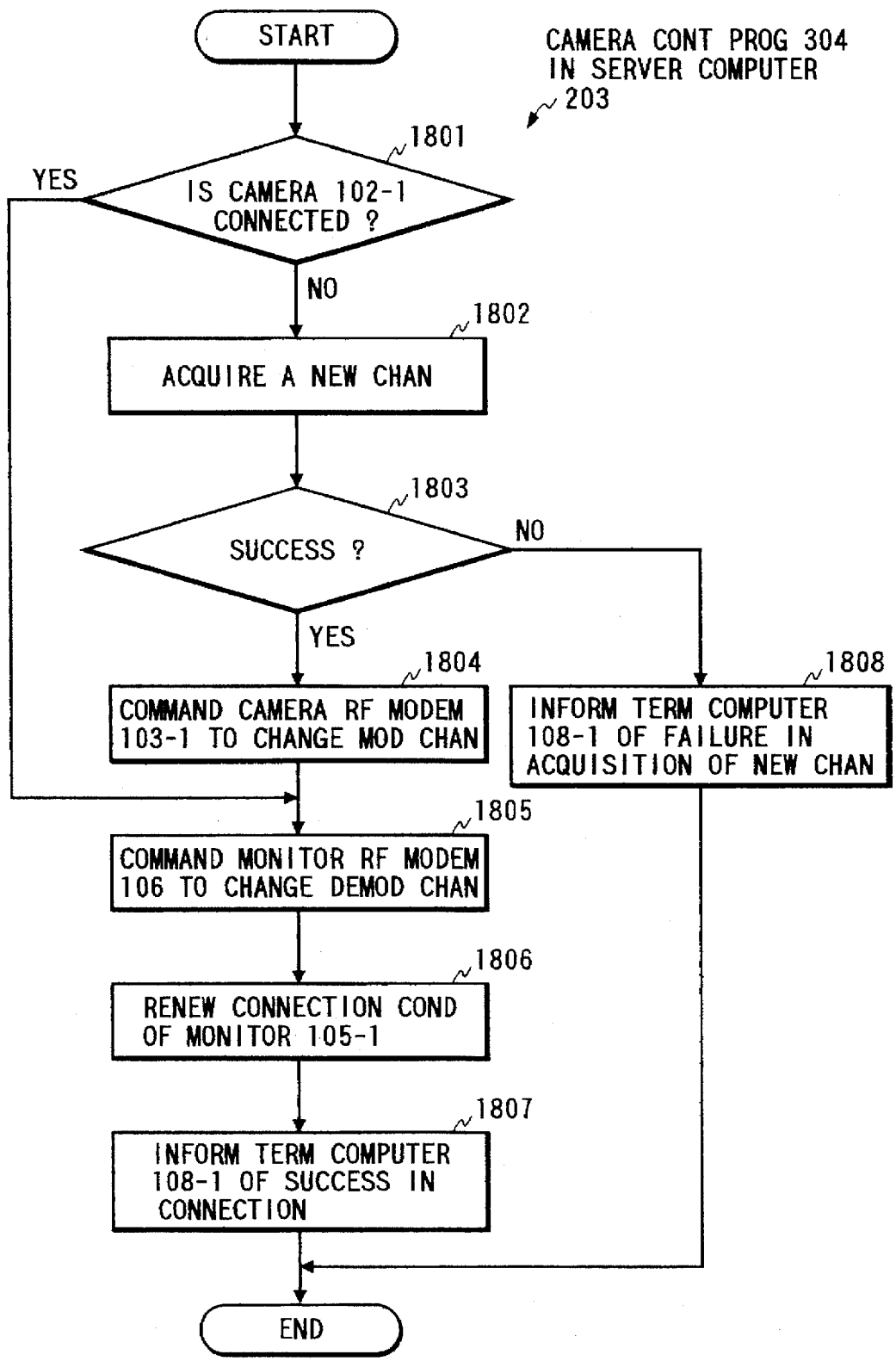
FIG. 18 is a diagram of a flow chart of the camera control program in FIG. 2.

An operation of monitoring a video signal will be described. For example, a video signal from a video camera 102-1 is displayed on the monitor 105-1 in accordance with processings represented by flow charts in FIGS. 16, 17, and 18. FIG. 16 is a diagram of a flow chart of monitor acquiring program 302 of the first embodiment. In response to a manual operation to the keyboard 318 by an operator, the monitor operation terminal computer 108-1 executes the monitor acquiring program 302 and in step 1601, the monitor operation terminal requests acquisition of the monitor 105-1 toward the server computer 111. FIG. 17 is a diagram of a flow chart of the connection control program 201 in FIG. 2 of the first embodiment. FIG. 18 is a diagram of a flow chart of the camera control program 203 in FIG. 2. In response to the request of acquisition of monitor 105-1 from the monitor terminal computer 108-1, the server computer 111 executes the connection control program 201. The server computer 111 receiving the request from the monitor operation terminal computer 108-1 as the control signal, makes a decision as to whether the monitor 105-1 has been acquired by another monitor operation terminal computer in step 1701. If the monitor 105-1 is not acquired, the server computer 111 renews a monitor connection table 212 in the RAM 207 to allow the monitor operation terminal computer 108-1 to use the monitor 102-1 in step 1702. In the following step 1703, the server computer 111 informs the monitor operation terminal computer 108-1 of success in the acquisition through the control signal. If the monitor 105-1-has been acquired in step 1701, the server computer 111 informs the monitor operation terminal computer 108-1 of failure in the acquisition through the control signal in step 1704.

Only one monitor 105 can be acquired by one of the monitor operation terminal computers 108 and it is possible to control a connection of a video signal to the monitor by only the monitor operation terminal computer 108 which has acquires the right of controlling the monitor 105.

In response to the information of the success in acquisition from the server computer 111, the monitor operation terminal computer 105-1 requests the server computer 111 to make a connection between the monitor 105-1 and the camera 102-1 in step 1603. The server computer 111 executes the camera control program 203 and in step 1801, the server computer 111 checks a connection condition of the camera 102-1 in a camera connection table 213 as to whether or not the camera 102-1 is being connected. If the camera 102-1 has not been connected, since there is no channel which has been used for the camera 102-1, the sever computer 111 tries to acquire a channel for the camera 102-1 in step 1802. If the server computer 111 succeeds in the acquisition of the channel in step 1803, the server computer 111 commands the camera RF modem 103-1 through the control signal to change the channel of modulation to the acquired channel in step 1804 and renews a channel control table 214. In the following step 1805, the sever computer 111 commands the monitor RF modem 106-1 to change the channel to the channel connected to the camera 102-1 to modulate the video signal from the camera 102-1. Then, the connection between the camera 102-1 and the monitor 105-1 is provided. Then, the server computer 111 renews a connection condition table 213 indicative of a connection condition of the monitor 105-1 in step 1806. Then, the server computer 111 informs the terminal operation computer 108-1 of success in connection in step 1807.

In step 1803, the server computer 111 fails in acquiring a new channel, the server computer 111 informs the terminal operation computer 108-1 of failure in acquisition of a new channel. In step 1801, if the camera 102-1 has been connected, the server computer 111 commands the monitor RF modem 106 to change the channel to the channel connected to the camera 102-1 in step 1805.

During the operation mentioned above, the monitor operation terminal computer 108-1 and the server computer 111 communicate through the control signal RF modems 109-1 and 112 via the coaxial cable 101 and the server computer 111 sends the control signals to the camera RF modem 103-1 and to the monitor RF modem 106-1 through the control signal RF modem 112 and the coaxial cable 101 to display a desired video signal from a desired camera on a desired monitor.

As mentioned, according to this embodiment, the server computer 111 having the connection control program 201 and the monitor control program 202 can provide an image from a desired camera on a desired monitor under control by the server computer 111. Therefore, if there are many requests connection to the same monitor or to the same camera substantially at the same time, such connections can be provided under control by the server computer 111.

In this embodiment, the camera RF modem 103-1 to 103-200 can change the modulation channel. However, it is also possible to use modems in which modulation channels are fixed but different and carriers can be controlled between ON and OFF.

An operation of controlling a camera 102 will be described.

Figure 19:
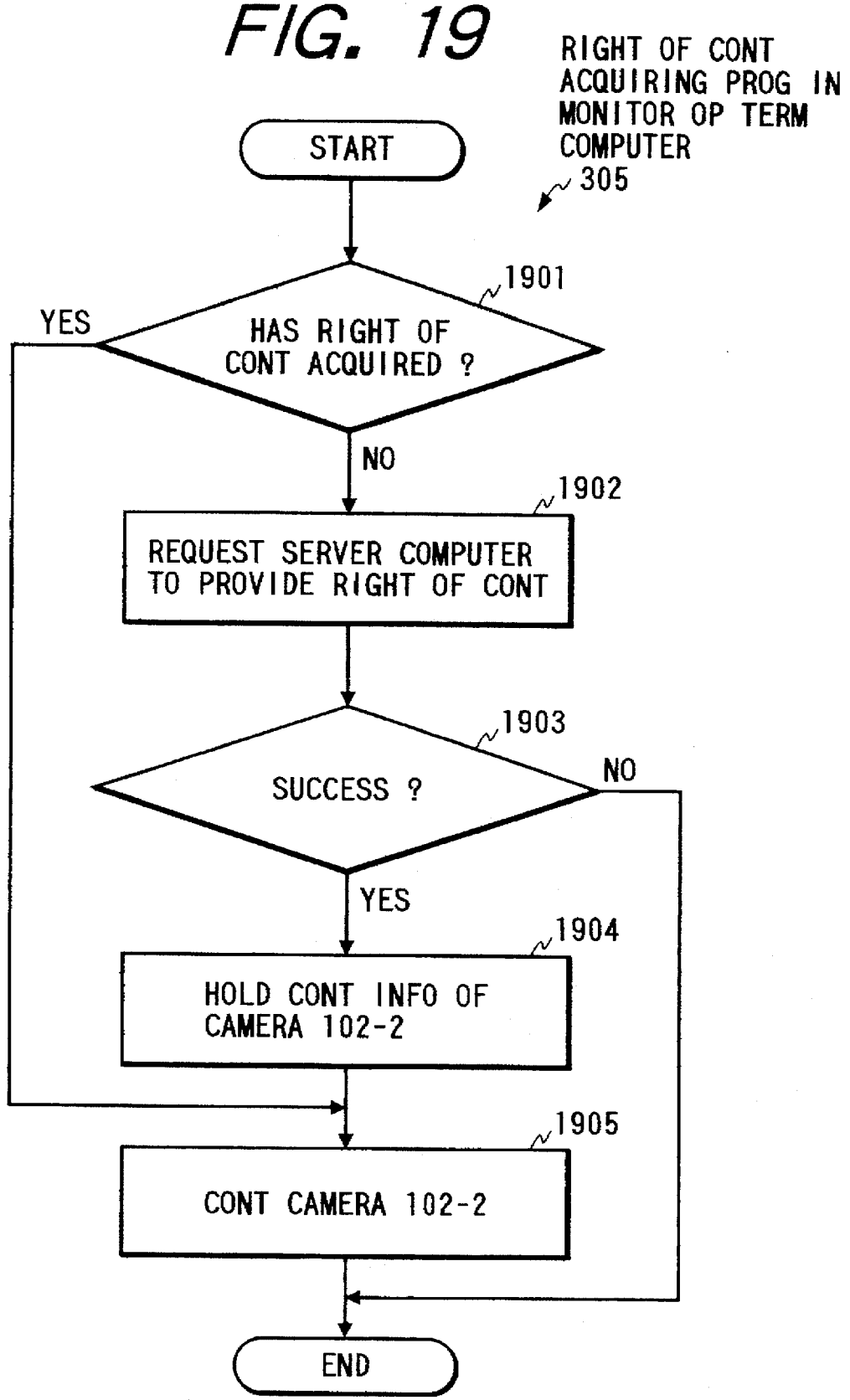
FIG. 19 is a drawing of a flow chart of a right of control acquiring program of the first embodiment.
Figure 20:
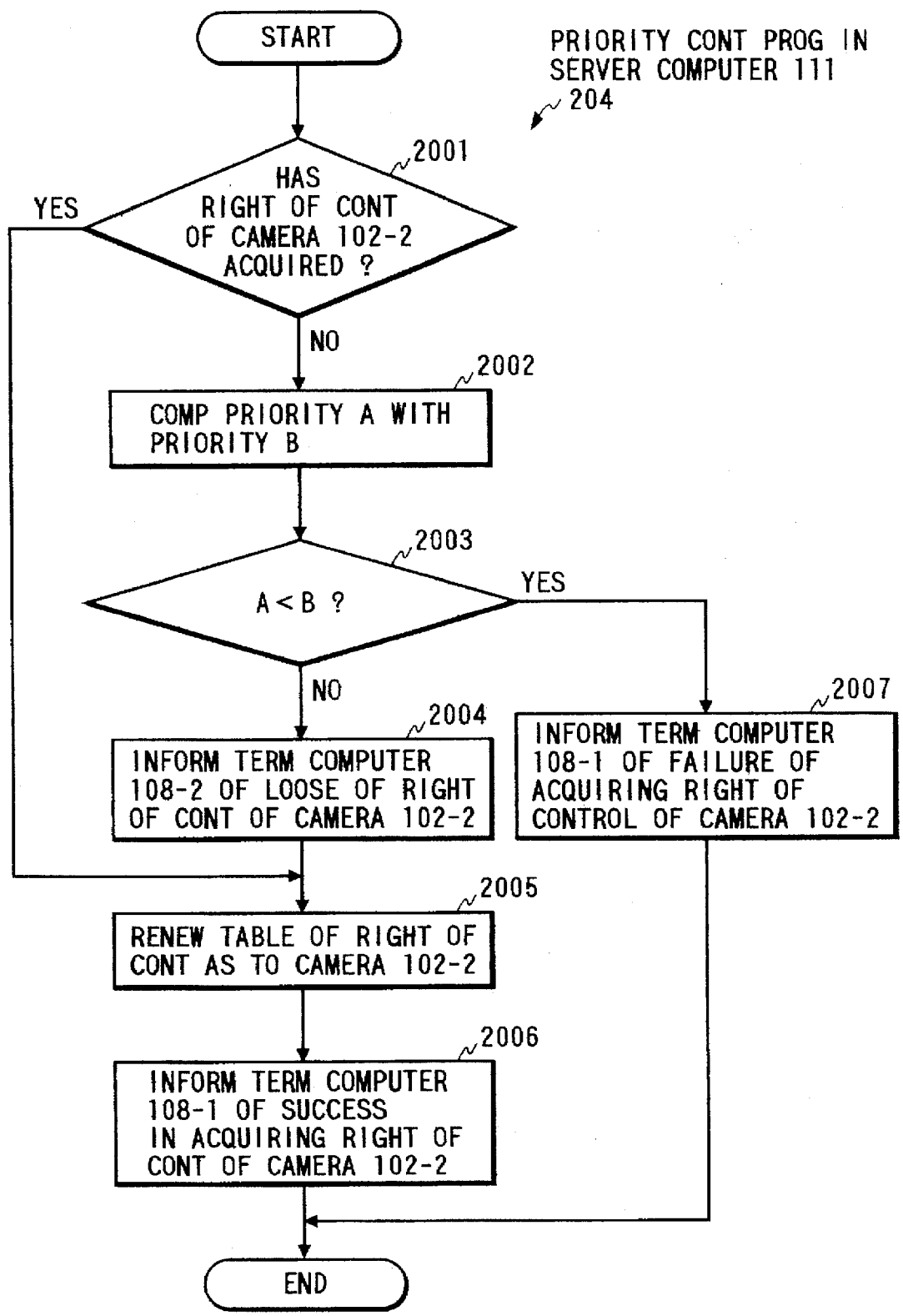
FIG. 20 is a drawing of a flow chart of the priority control program in the server computer of the first embodiment.

FIG. 19 is a drawing of a flow chart of a right of control acquiring program 305 in the monitor operation computer 108 of the first embodiment. FIG. 20 is a drawing of a flow chart of the priority control program 204 in the server computer 111 of the first embodiment.

When there is a necessity of controlling a camera 102-2, in response to an operation of the keyboard 318, the monitor operation terminal computer 312 makes a decision as to whether or not a right of control of the camera 102-2 has been acquired by checking whether or not information indicating that a right of control has received in step 1901. If the right of control of the camera 102-2 has not acquired, the monitor operation terminal computer 108-1 requests the server computer 111 to provide the right of control of the camera 102-2 through the control signal in step 1902 and waits the result in step 1903.

The server computer 111 receiving the request judges whether the right of control of the camera 102-2 has been acquired by another terminal operation computer in step 2001. If the right of control of the camera 102-2 has not been acquired by another monitor operation terminal, the server computer 111 renews a table of right of control of cameras as to the camera 102-2, that is, a camera control table 216 in step 2005 and informs the monitor operation terminal computer 108-1 of success in acquiring right of control of camera 102-2 in step 2006.

Then, in step 1903, processing proceeds to step 1904 and the monitor terminal operation computer 108-1 holds the information of the right of control and information of controlling the camera 102-2. Then, the monitor operation terminal computer 108-1 can control the operation of the camera 102-2 until the sever computer 111 commands the monitor operation terminal computer 108-1 to release the right of control of the camera 102-2 in step 1905.

If the right of control of the camera 102-2 has been acquired by the monitor operation terminal computer 108-2 yet in step 2001, the server computer 111 compares a priority A of the monitor operation terminal 108-1 with a priority B of the monitor operation terminal 108-2 in step 2002 and 2003. In step 2003, if the priority of the monitor operation terminal 108-1 is higher than that of the monitor operation terminal 108-2, the server computer 111 informs the monitor operation terminal computer 108-1 of failure of acquiring the right of control of the camera 102-2 in step 2007. Therefore, the monitor operation terminal computer 108-1 cannot control the camera 102-2.

If the priority of the monitor operation terminal 108-2 is not higher than that of the monitor operation terminal 108-2, the sever computer 111 informs the monitor operation terminal computer 108-2 of losing the right of the control of camera 102-2 in step 2004. When the monitor operation terminal computer 108-2 which acquired the camera 102-2 is informed of losing the right of control of the camera 102-2, the monitor operation terminal computer 102-2 deletes the control information of the camera 102-2 in the camera control table 216 using the control information release program 310. Then, the monitor operation terminal computer 108-2 cannot control the camera 102-2.

On the other hand, server computer 111 provides the right of control of the camera 102-2, that is, renews the camera control table 216 in step 2005 and informs the monitor operation terminal computer 108-1 of success in acquiring the right of control of the camera 102-2 in step 2006. Then, the monitor operation terminal holds control information of the camera 102-2 in step 1904.

Then, the monitor operation terminal computer 108-1 can control the operation of the camera 102-2 by the camera operation program 306 until the sever computer 111 commands the monitor operation terminal computer 108-1 to release the right of control of the camera 102-2 in step 1905.

As mentioned, the cpu 602 of the control signal RF modems 109 and 112 executes processings in accordance with the flow charts shown in FIGS. 33 and 35 to provide a communication between the monitor operation terminal computer 108 and the server computer 111 and controlling the monitor RF modems 106 and camera RF modems 103 by the control signal RF modems 109 and 112. On the other hand, the cpu 503 of the monitor RF modem 106 and the cpu 403 of the camera RF modem 103 executes processings in accordance with the flow charts shown in FIGS. 33 and 34.

A second embodiment will be described.

Figure 7:
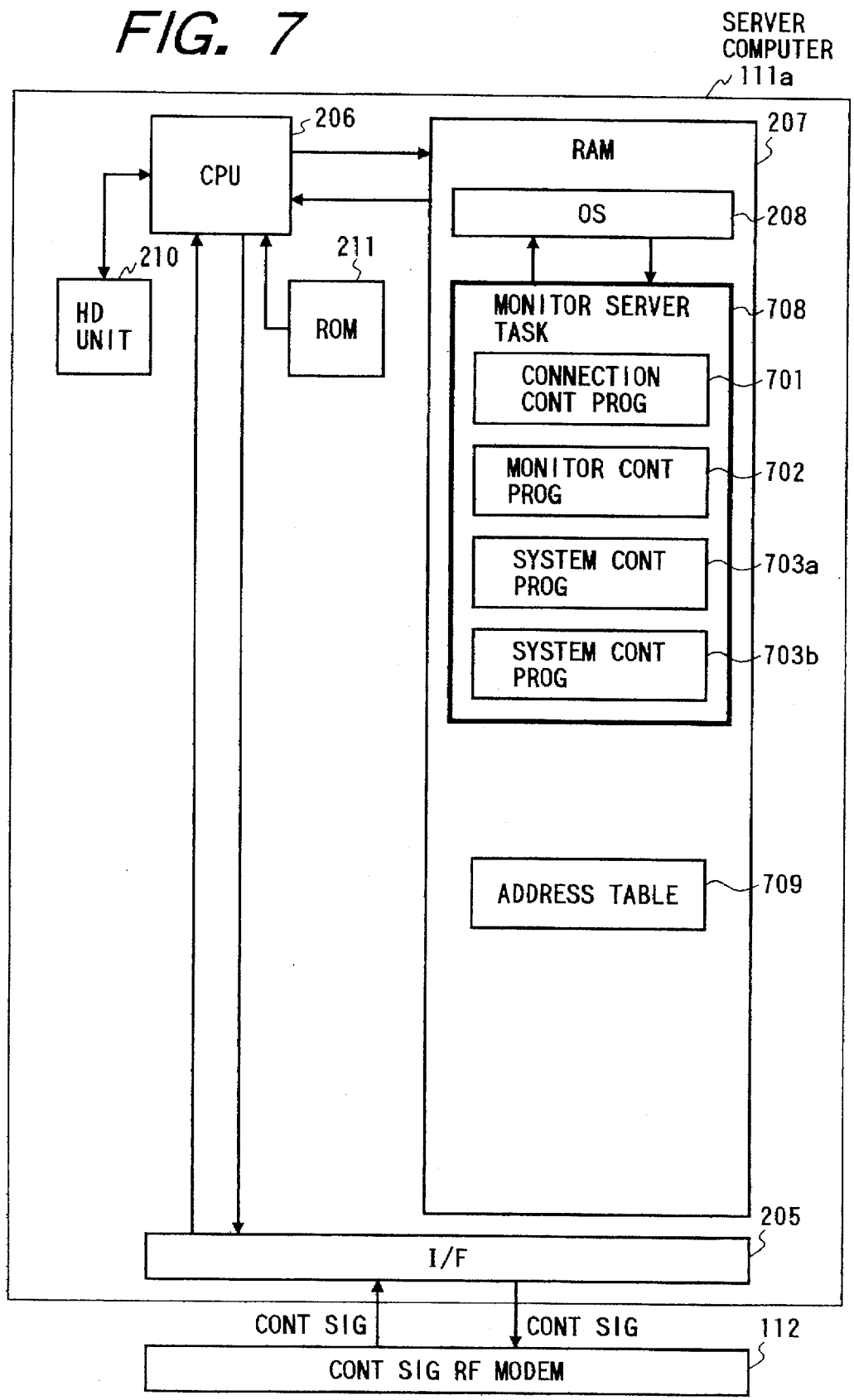
FIG. 7 is a block diagram of the server computer of the second embodiment.

The video monitor system of the second embodiment has substantially the same structure as the video monitor system of the first embodiment. A different between first and second embodiment is in the programs in the server computer and the RF modems. FIG. 7 is a block diagram of the server computer of the second embodiment.

That is, the hard disc unit 210 of the sever computer 111a stores a connection control program 701, a monitor control program 702, a system control program 703 and an address table 709. The cpu 205 transfers these programs and the address table 709 to the RAM 706 at the initial condition in accordance with a program in the ROM 211. FIG. 7 shows the condition after transferring these programs and the address table of the second embodiment.

FIG. 21 is a diagram of a flow chart of the system control program 701 of the second embodiment shown in FIG. 7.

At the initial condition after the transferring the programs and the address table 709 in the hard disc unit 210 to the RAM 207, the cpu 206 executes the system control program 703 shown in FIG. 21. The server computer 111a commands the control signal RF modem 112 to transmit a control signal indicative of inquiring which video channel is used and commanding this inquiry to all modems, that is, the camera RF modems 104 and the monitor RF modems 106 in step 2101 through multiple addressing such as a broadcasting or a multi-cast function in the control signal RF modem 112 in accordance with an address table 709 storing addresses of RF modems 103, 106, 109, and 112 correspondingly storing information of video signal outputting or inputting condition. The control signal RF modem 112 generates the control signal indicative of inquiring which video channel is used and transmits this inquiry to more than one of the camera RF modems and more than one monitor RF modem 106 using the multiple addressing function through the control signal modulation circuit 603.

When each of the modems receiving the inquiry, the cpu 403 and the cpu 503 respond this inquiry and transmit answers, that is, the conditional data of a video-signal-outputting condition including data indicative of which channel is used and information of video-signal-inputting condition including data indicative of which channel is used to the server computer 111a. This conditional data is stored in step 3307 shown in FIG. 33.

The server computer 111a waits the responses from the modems to which the server computer 111a transmitted the inquiry for a predetermined interval in step 2102, 2103, and 2104. The server computer 111a receives the answers in step 2102 and stores the answers in step 2106. In step 2104, if any of RF modems to which the server computer 111a transmitted the inquiry does not respond the inquiry within the predetermined interval, the server computer 111a inhibits use of the modem to which the server computer 111a transmitted the inquiry and does not respond the inquiry within the predetermined interval to use in step 2105. That is, when the server computer 111a executes the connection control program 701, the server computer 111a does not connects that modem in accordance with this result, i.e., inhibition of use.

Figure 8:
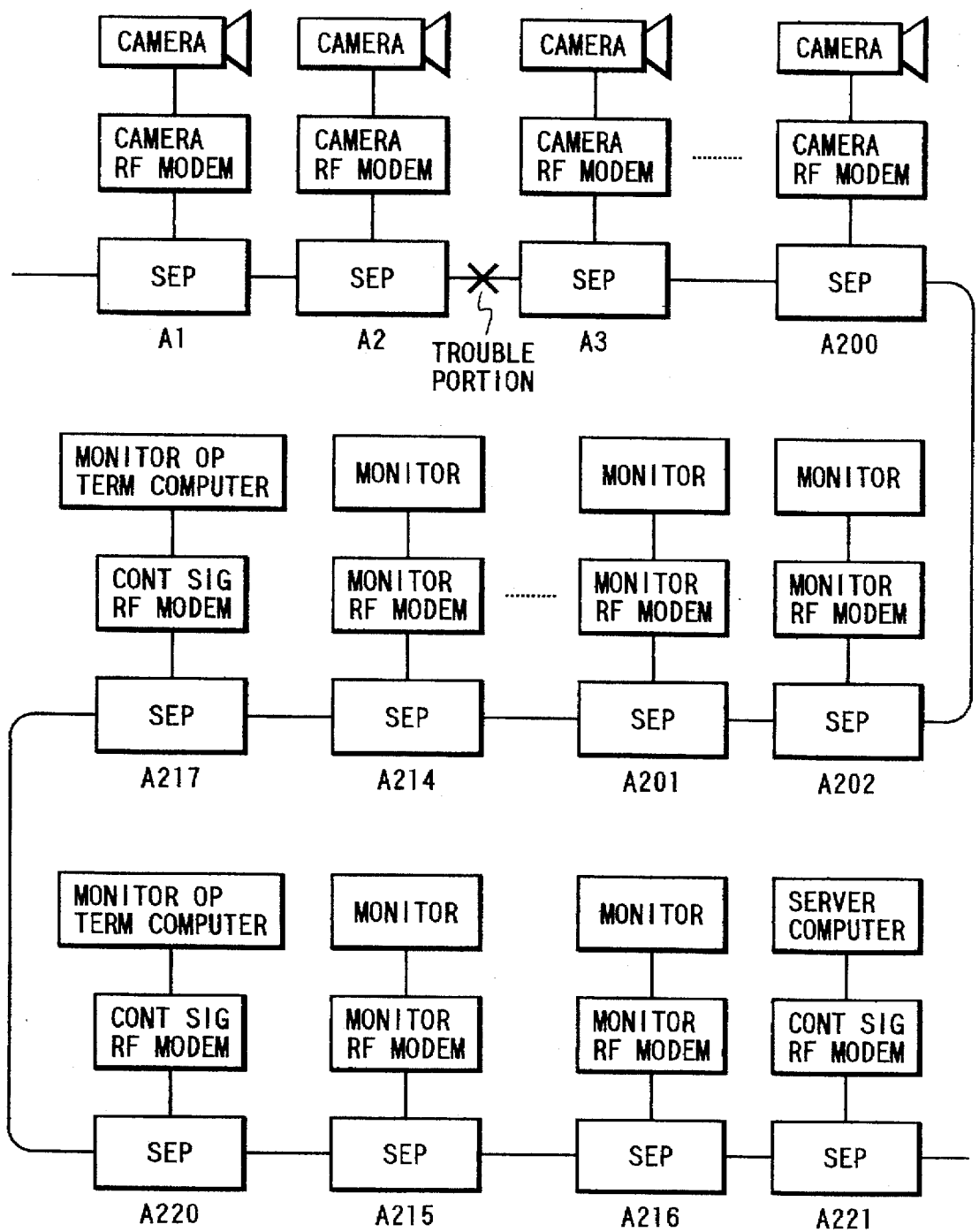
FIG. 8 is a block diagram of an example of a video monitor system of the second embodiment indicating the trouble portion.

In this embodiment, the server computer 111a can detect a trouble portion. FIG. 8 is a block diagram of an example of a video monitor system of the second embodiment indicating the trouble portion. In FIG. 8, a trouble occurs in the coaxial cable 101 between the bi-directional separators having addresses A2 and A3. FIG. 9 is a diagram of an address table of the second embodiment shown in FIG. 7 explaining the condition of occurrence of the trouble portion, for detecting the trouble portion.

The server computer 111a executes the system control program 703b to detect a trouble portion.

At the initial condition after the transferring the programs and the address table 709 in the hard disc unit 210 to the RM 207, the cpu 206 executes the system control program 703b shown in FIG. 22 or executes the system control program 703b periodically. The server computer 111a commands the control signal RF modem 112 to transmit a control signal indicative is used and used video channel is used and commanding this inquiry to more than one of camera RF modems 103 and to more than one of monitor RF modems 106 in step 2201 through multiple addressing such as the broadcasting or the multi-cast function in the control signal RF modem 112 in accordance with the address table 709 storing addresses of RF modems 103, 106, 109, and 112 and correspondingly storing information of video signal outputting or inputting condition. The control signal RF modem 112 generates the control signal indicative of inquiring which video channel is used and transmits this inquiry to more than one of the camera RF modems and more than one monitor RF modem using the multiple addressing function through the control signal modulation circuit 603 in step 2201.

Each of the modems receiving the inquiry, the cpu 403, and the cpu 503 respond this inquiry and transmit answers, that is, information of a video signal outputting condition including data indicative of which channel is used and information of a video signal inputting condition including data indicative of which channel is used to the server computer 111a.

The server computer 111a waits the responses from the RF modes to which the server computer 111a transmitted the inquiry for a predetermined interval in step 2202, 2203, and 2204. The server computer 111a receives the answers in step 2202 and stores the answers in step 2205. In step 2204, if any of RF modems to which the server computer 111a transmitted the inquiry does not respond the inquiry within the predetermined interval, processing proceeds to step 2205. Then, in step 2206 the server computer 111a predicts a trouble potion from data the RF modems to which the server computer 111a transmitted the inquiry with the RF modems responding this inquiry and a connection relation represented by the address table shown in FIG. 9.

This results is also stored in the address table 709 with a correspondence with the addresses of RF modems.

When the server computer 111a executes the connection control program 701, the server computer 111a uses this result from the address table 709.

As shown in FIG. 9, the address table formed in the RAM 313 includes information of kinds of each of units, that is, the camera 102, the monitor 105, the monitor operation terminal computer 108, and the server computer 111a, a connection relation with neighbor terminals, and the result (response 804) of the answer mentioned above with a correspondence with address 802. If the trouble portion occurs as shown in FIG. 8, the camera RF monitors having addresses A1 and A2 do not response to the inquiry from the server computer. The camera having address A2 locates between the cameras having addresses A1 and A3, which is represented by the data 803 in the column of kind and address of neighbour modem. Therefore, the server computer 111a having an address A221 can predicts that the trouble occurs between the cameras having addresses A2 and A3.

As mentioned, according to this embodiment, not only trouble in a modem but also a trouble in a network can be detected by providing diagnostic functions with the system control programs 703a and 703b in the server computer 111a.

A third embodiments will be described.

Figure 10:
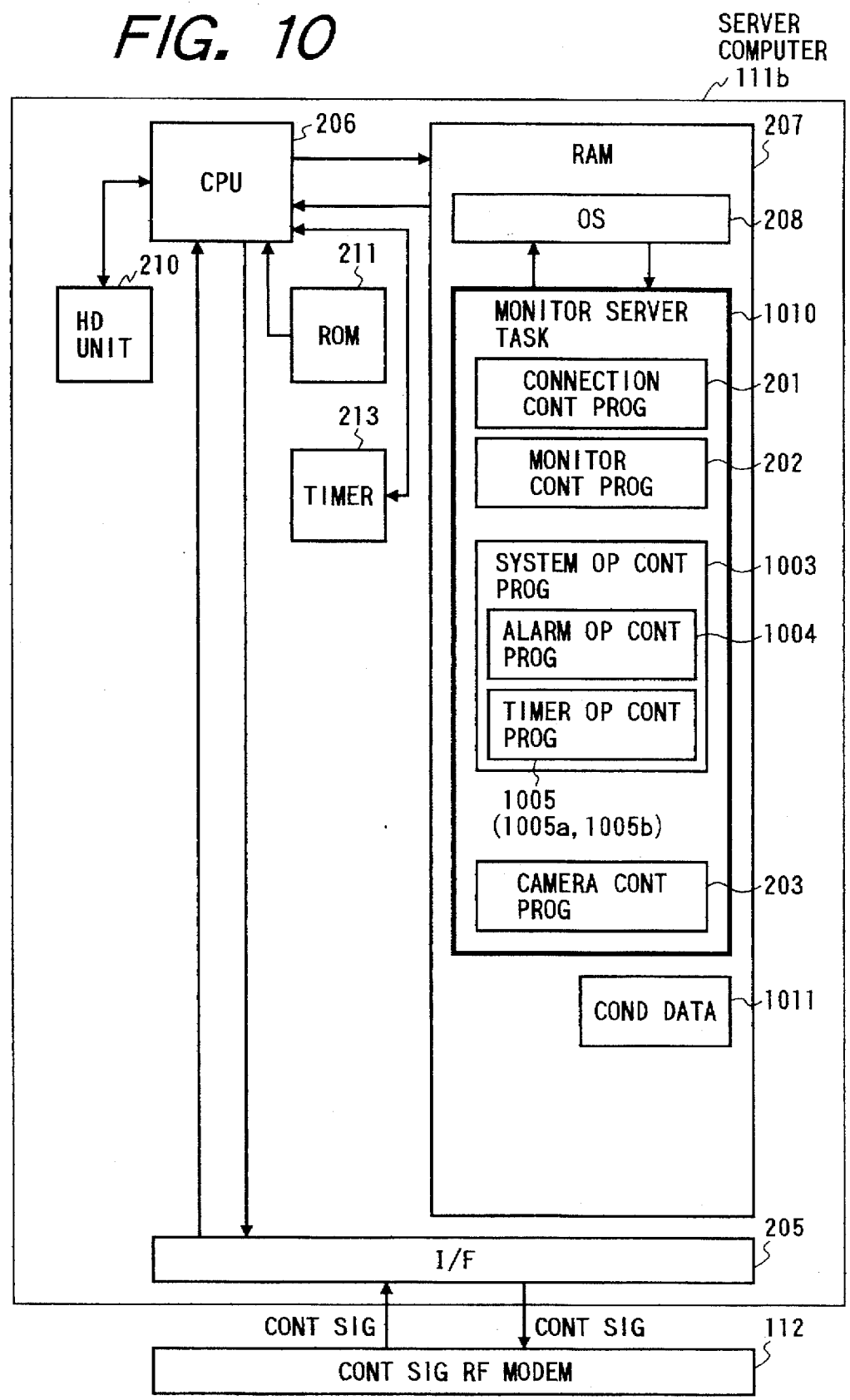
FIG. 10 is a block diagram of the server computer of the third embodiment.

FIG. 10 is a block diagram of the server computer 111b of the third embodiment.

A video monitor of the third embodiment has an optional modes such as an alarm activating mode and a timer operation mode in addition to the basic operation as described in the first embodiment. The basic structure is similar to that of the first embodiment. A different between the first and third embodiments is in that a system operation control program 1003 including an alarm operation control program 1004 and a timer operation control program 1005 and a timer 213 are further provided and the camera modem 401 receives and sends an alarm signal to the server computer 111b. These programs in the hard disc unit 210 and transferred to the RAM 207.

The server computer 111b receives a control signal indicative of the alarm signal from the camera RF modem 103 or the like transmitted through the coaxial cable 101 and executes the alarm operation control program 1004 in response to this. Moreover, the server computer 111b executes a predetermined operation in response to the timer 213 at a predetermined timing. The server computer 111b stores data of operational conditions (conditional data) before executing the alarm operation or the timer operation and after completion of the alarm operation or the timer operation, the server computer 111b recovers the operational condition to the former condition with the system operation control program 1003.

FIG. 23 is a diagram of a flow chart of the alarm operation control program in the server computer 111b of the third embodiment.

When the control signal indicative of alarm is transmitted from one of the camera RF modems 103, the server computer 111b receives the control signal and executes the alarm operation control program 1004. In step 2301, the server computer 111b stores or preserves conditional data such as the connection condition data or data stored in the address table in step 2302. In the following step 2102, the server computer 111b executes an alarm processing in accordance with the kind of the alarm in step 2303. The server computer 111b stops the alarm operation processing when a predetermined interval has passed in step 2305 or a request for stopping the alarm operation processing from one of monitor operation terminals 108 in step 2304. Then, the server computer 111b stops the alarm operation processing in step 2306 and reads the stored conditional data from RAM 207 and executes the normal control processing mentioned in the first embodiment using this conditional data of the operational condition.

FIGS. 24A and 24B are diagrams of flow charts of the third embodiment. The server computer 111b receives a control signal indicative of a request for the timer operation including data of a start time and a kind of timer operations in step 2408. Then, the server computer 111b sets and starts the timer 213 and permits the timer interruption.

When the start time has come, the server computer 111b responsive to the timer 213 executes the processing shown in FIG. 24B, in step 2401, the server computer 111b stores or preserves conditional data such as the connection condition data or data stored in the address table. In the following step 2402, the server computer executes the timer operation in accordance with the data indicative of the kind of the timer operation in step 2403. The server computer 111b stops the timer operation processing when a predetermined interval has passed in step 2405 or a request for stopping the timer operation processing from one of monitor operation terminals 108 in step 2404. Then, the server computer 111b stops the timer operation processing in step 2406 and reads the stored operational data from RAM 207 and executes the normal control processing mentioned in the first embodiment using this data of the conditional data again.

As mentioned, according to the third embodiment, the alarm operation and the timer operation or the like can be executed during the normal operation by providing the system operation control program 1003 for storing the video signal connection condition. This operation makes it possible to turn on a light (not shown) provided adjacent to the camera modem which sent the alarm in response to the alarm and to change monitoring locations in accordance with day time or night time or the day of the week.

A fourth embodiment will be described.

The video monitor system of the fourth embodiment performs a sequence controlled monitoring operation and an effective recording operation of the video signal.

Figure 11:
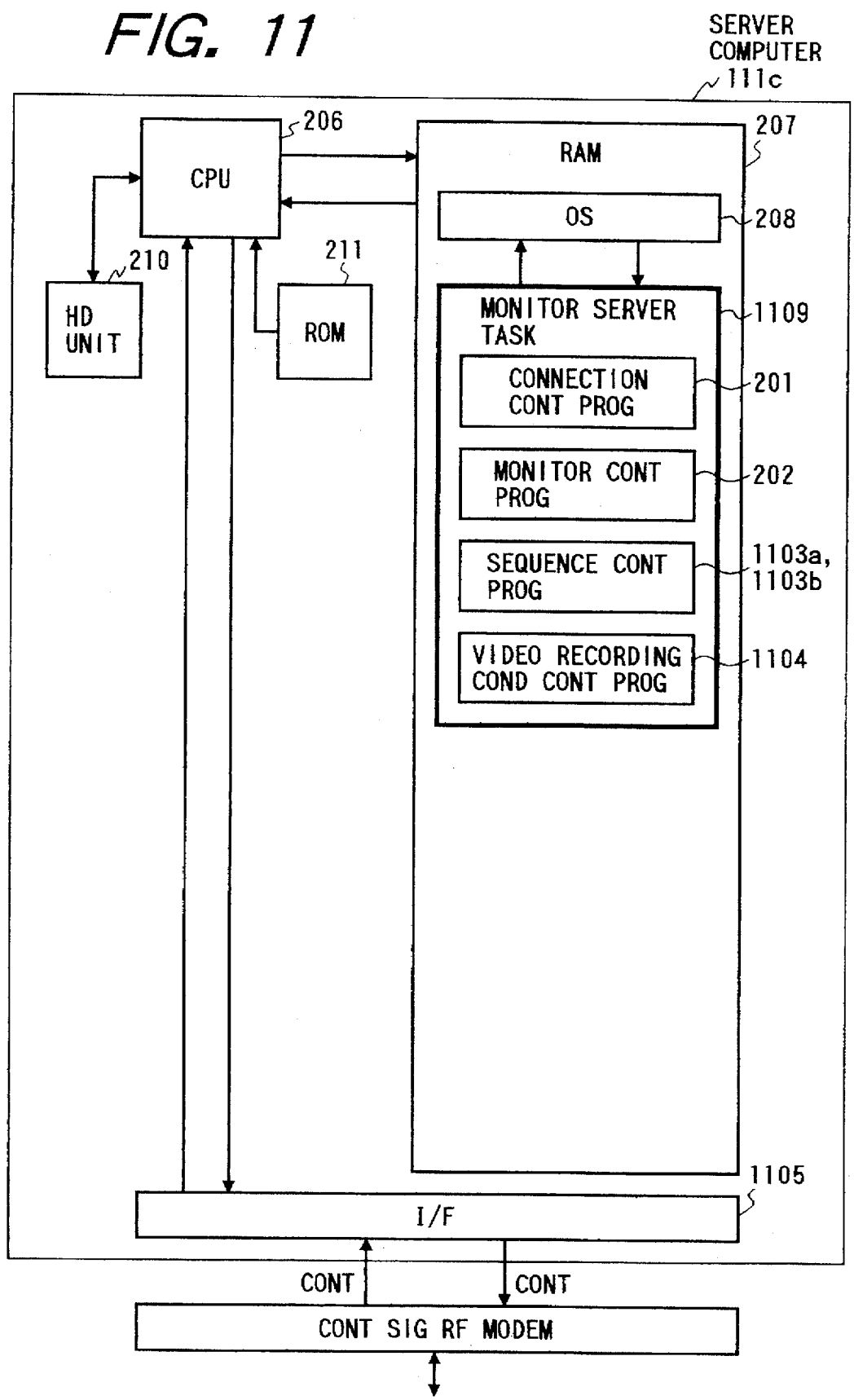
FIG. 11 is a block diagram of a server computer of the fourth embodiment.

FIG. 11 is a block diagram of a server computer 111c of the fourth embodiment.

The basic structure of the fourth embodiment is similar to that of the first embodiment. A different between the first and fourth embodiments is in that a sequence control program 1103a and 1103b for generating command data for controlling the monitor RF modems 105 and the camera RF modems 103 and a video recording condition control program 1104 for generating command data through the control signal for controlling start and stop of recording by the VTR 114 are further provided in the hard disc unit 210 and transferred to the RAM 207.

Figure 12:
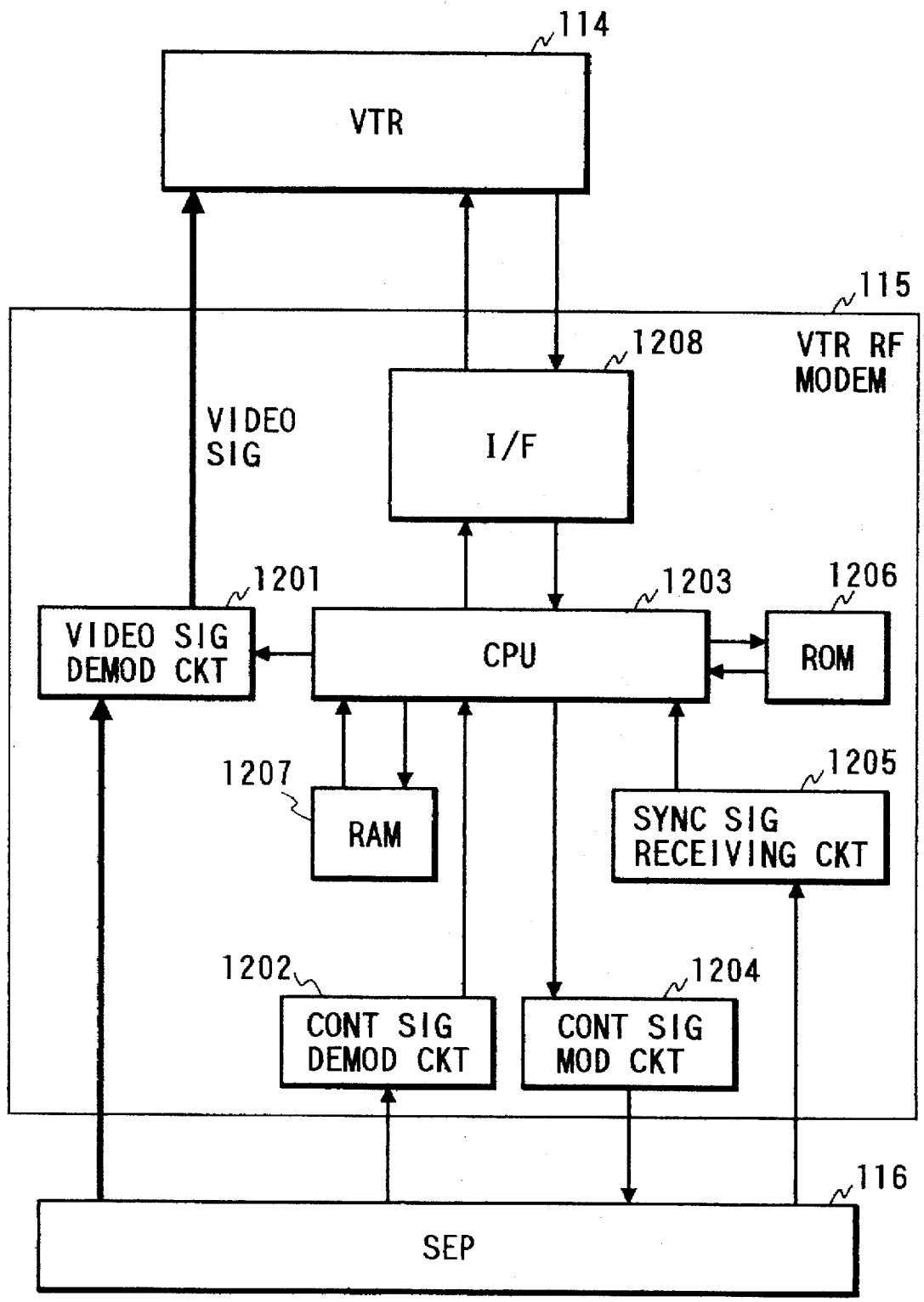
FIG. 12 is a block diagram of a set of VTR portion in FIG. 1 of this invention.

FIG. 12 is a block diagram of a set of VTR portion including the VTR 114, a VTR RF modem 115, and a bi-directional separator 116 of this invention shown in FIG. 1.

The VTR RF modem 115 comprises a video signal demodulation circuit 1201 for demodulating the RF video signal having a carrier frequency, which can be changed (a channel is selected), into a baseband video signal and sending the demodulated video signal to the VTR 114, a control signal demodulation circuit 1202 for demodulating a control signal having the predetermined carrier frequency from the bi-directional separator 116, a ROM 1206 for storing programs, an interface circuit 1208 for interfacing between VTR 114 and cpu 1203, a RAM 1207 for storing data and programs, a cpu 1203 for effecting predetermined operations in response to the control signal demodulated by the control signal demodulation circuit 1202 in accordance with programs stored in the ROM 1206 and sending a control signal from the VTR 114, a control signal modulation circuit 1204, and a synchronizing signal receiving circuit 1205 for receiving the synchronizing signal transmitted on the coaxial cable 101. The cpu 1203 effects the operations such as a control of turn-ON or turn OFF of the carrier signal in the video signal demodulation circuit 1201, a control of changing the modulation and demodulation frequency, and outputting the control signal from the monitor 1203 in response to the control signal from the bi-directional separator 116 in accordance with the programs stored in the ROM 1206 using an interruption as shown by the flow chart in FIG. 31 as similar to the monitor RF modem 106. However, processings executed in response to commands directed to this VTR RF modem 1201 stored in the ROM 1206 is such as a transmitting processing of a received control signal to the VTR 114, which is specially provided to the VTR RF modem.

On the other hand, when the cpu 1203 detects a control signal from the VTR 114, the cpu 1203 executes the program also stored in the ROM 1206 as shown in FIG. 33 as similar to the camera RF modem 103.

The camera RF modem 103 and the monitor RF modem 106 have sequence operation storing functions and sequence operation executing functions. These functions are performed by the cpu 403 and the cpu 503 in accordance with programmes as shown in FIG. 33, stored in the ROM 406 and ROM 506, for these functions. The RAM 407 and RAM 507 are used to store the sequence operations.

The control signal RF modem 112 connected to the server computer 111 has a broadcasting function for providing broadcasting or multi-casting operation toward a plurality of camera RF modem 103 and a plurality of monitor RF modem 106.

Moreover, the monitor operation terminal computer 108 has a program for setting the sequence operation and producing a request of the sequence operation.

In the sequence operation, a plurality of monitors display images from a plurality of cameras such that an image on a monitor is periodically switched from one of video signals in one group of cameras and an image on another monitor is periodically switched from one of video signals from another group of cameras, wherein both images on the monitors are switched at the same timing.

Figure 25:
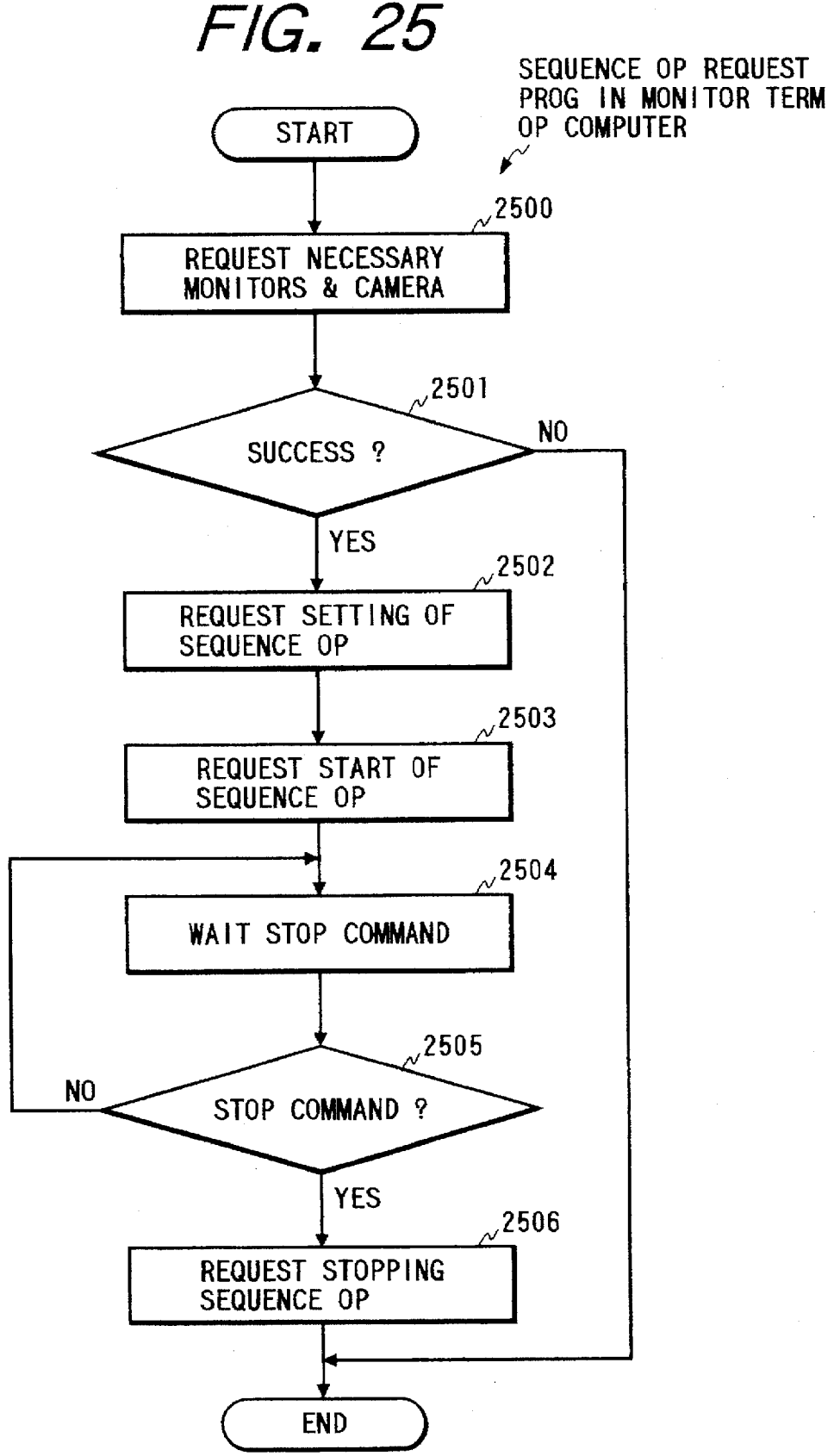
FIG. 25 is a diagram of a flow chart of a sequence operation request program in the monitor terminal operation computer of a fourth embodiment.

FIG. 25 is a diagram of a flow chart of a sequence operation request program in the monitor terminal operation computer 108 of the fourth embodiment.

Figure 26:
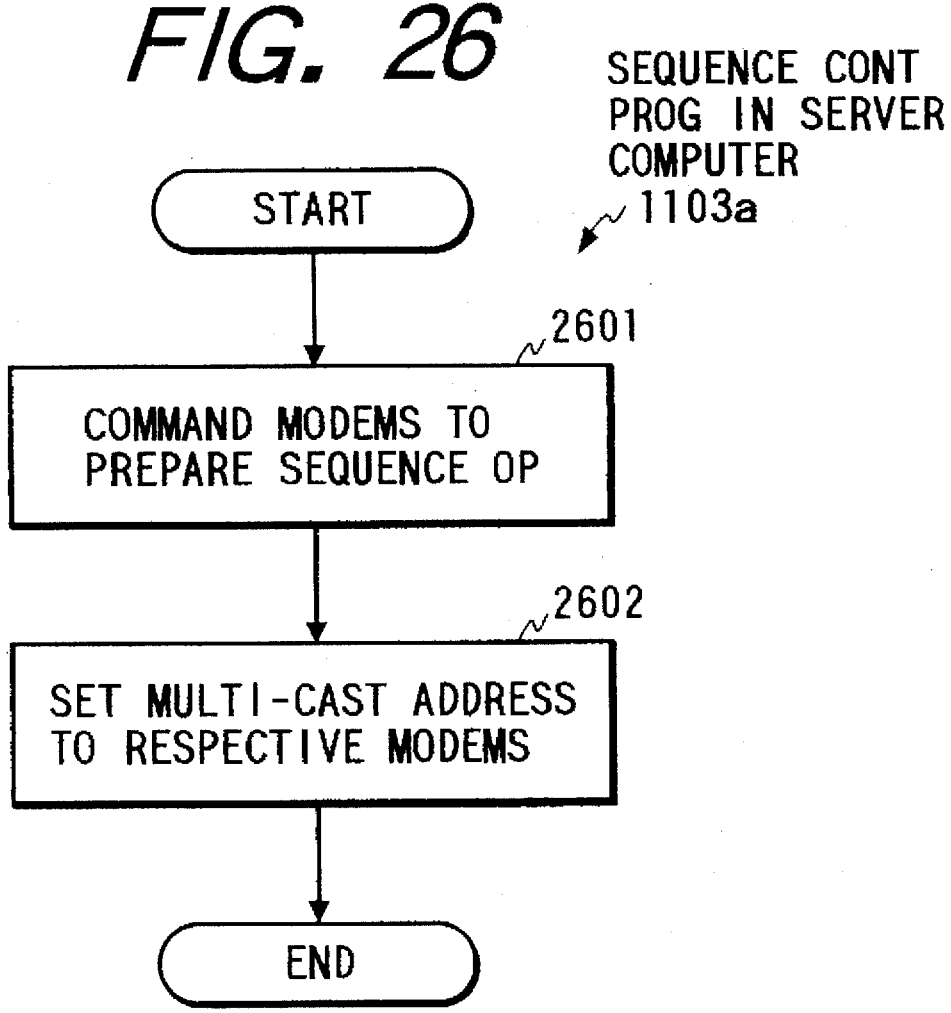
FIG. 26 is a diagram of a flow chart of a sequence control program in the sever computer of the fourth embodiment.

FIG. 26 is a diagram of a flow chart of a sequence control program 1003a in the sever computer 111c of the fourth embodiment.

Figure 27:
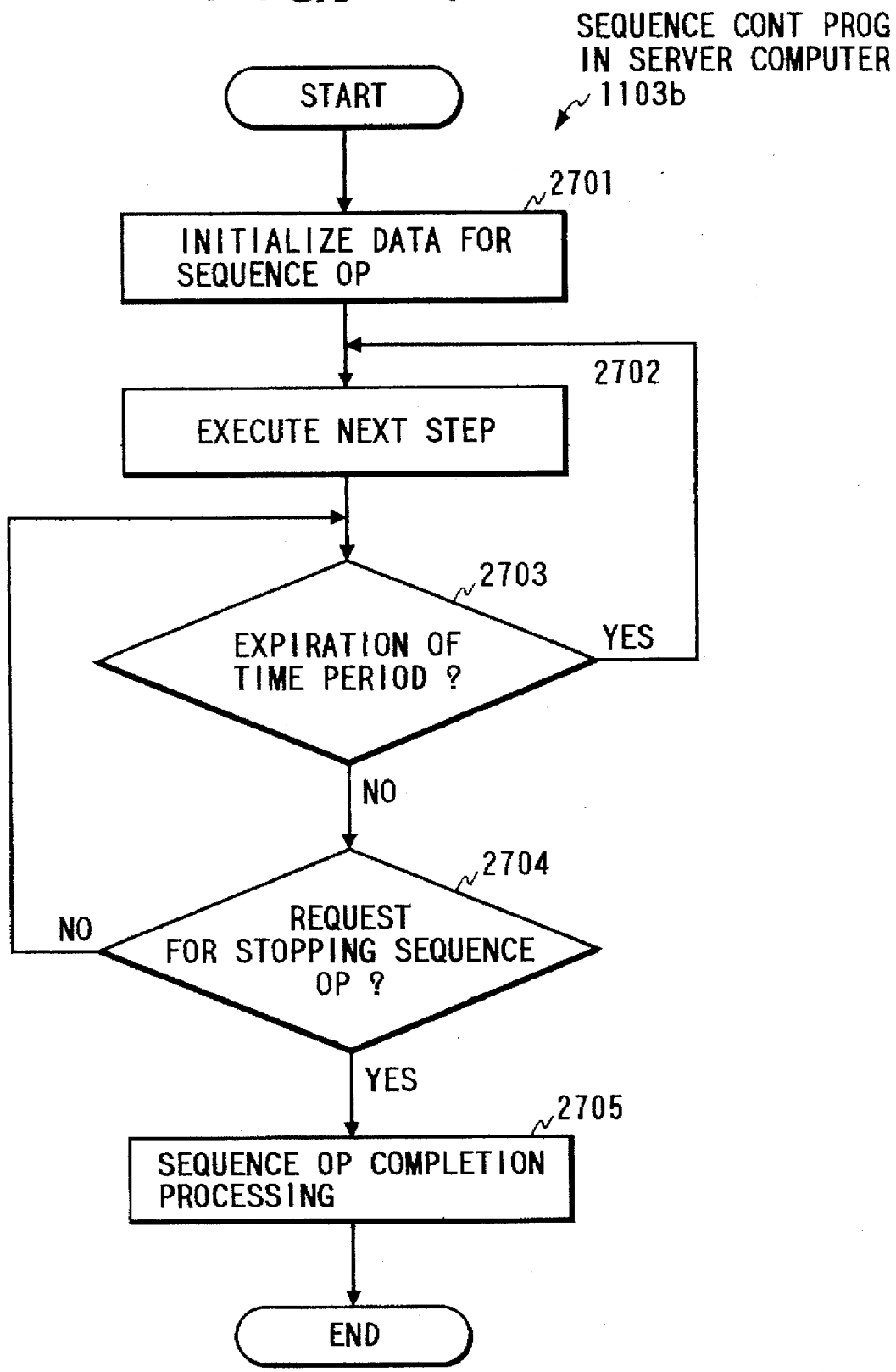
FIG. 27 is a diagram of a flow chart of a sequence control program in the sever computer of the fourth embodiment.

FIG. 27 is a diagram of a flow chart of a sequence control program 1003b in the sever computer of the fourth embodiment.

The monitor operation terminal computer 108 requests the server computer 111c to allow to use monitors 105 and cameras 102 which are necessary for the sequence operation in step 2500 in response to a manual operation through the keyboard. In response to this, the server computer 111c executes the connection control program 201 and informs the monitor terminal operation computer 108 of the result.

In step 2501, if result shows that the monitor operation terminal computer succeeds in using the necessary monitors and the necessary cameras processing proceeds to step 2502. If the monitor operation terminal computer fails in using the necessary monitors and the necessary cameras processing ends.

In step 2502, the monitor terminal operation computer 108 requests the server computer 111c to set it to a sequence operation.

In response to this, the server computer 111c executes the sequence control program 1103a.

In step 2603, the server computer 111c commands RF modems 103 and 106 to set data for sequence control to prepare the sequence operation. That is, the server computer 111c commands the monitor RF modems 106 and the camera RF modems 103 necessary for the sequence operation to store steps of a sequence operation and transmits the steps. Then, the server computer 111c sets a multi-cast address to respective modems for the sequence operation to send each of steps of the sequence operation to the necessary RF modems at the same time.

Then, the monitor operation terminal computer 108 requests to start the sequence operation in step 2503.

In response to this, the server computer 111c executes the sequence control program 1103b. In step 2701, the server computer 111c initializes data for the sequence operation. In the following step 2702, the server computer 111c requests the necessary RF modems to execute a next step of the sequence operation. In step 2703, if a time period of the sequence operation has passed, the server computer 111c requests the necessary RF modems to execute a next step of the sequence operation in step 2702. If the time period of the sequence operation has not passed, the server computer 111c checks whether or not there is a request for stopping the sequence operation in step 2704.

On the other hand, the monitor terminal operation computer 108 waits a stop command from the keyboard in step 2504 and 2505. If there is the stop command from the keyboard, the monitor operation terminal computer 108 requests the server computer 111c to stop the sequence operation in step 2506.

The server computer 111c executes a sequence operation completion processing in step 2705 when the request for stopping sequence operation is detected in step 2704. In the following step in 2705, the server computer executes the sequence operation completion processing to restore the condition of the video monitor system in the normal mode.

Figure 28:
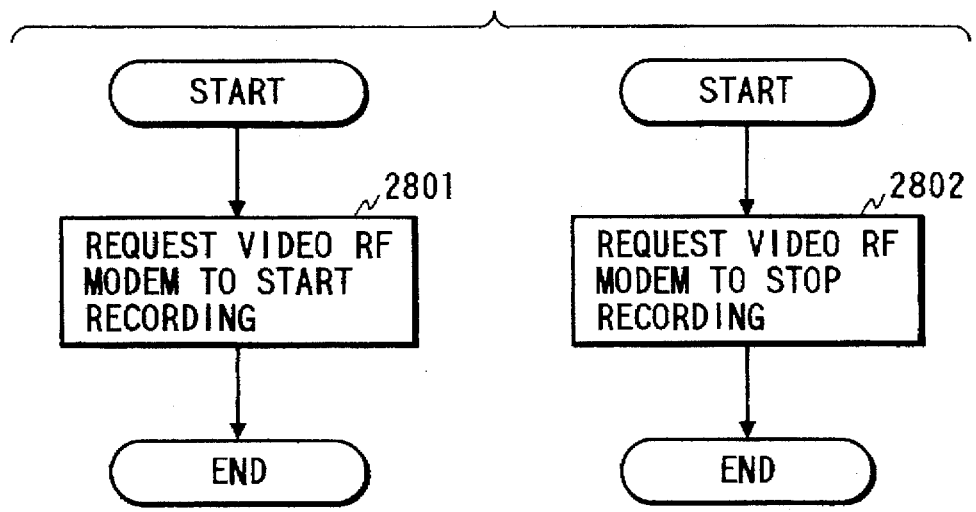
FIG. 28 is a diagram of flow charts of the server computer of the fourth embodiment.
Figure 29:
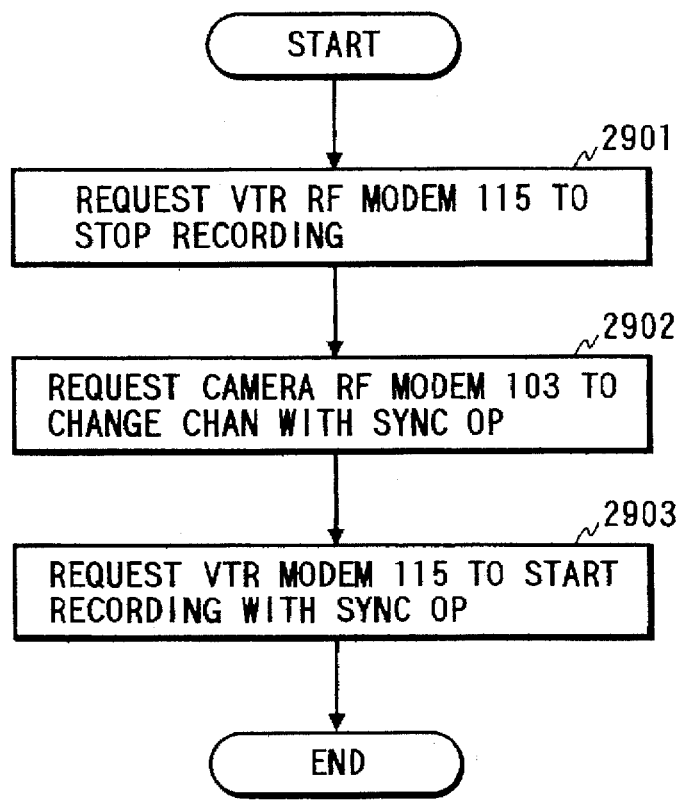
FIG. 29 is a diagram of a flow chart of the server computer of the fourth embodiment.

FIG. 28 is a diagram of flow charts of the server computer 111c of the fourth embodiment. FIG. 29 is a diagram of a flow chart of the server computer of the fourth embodiment.

On starting recording a video signal, the server computer 111c sends data of channel of a video signal to be recorded to the VTR RF modem 115 and commands the VTR RF modem 115 to start recording the video signal of the channel in step 2801 with the video recording condition control program 1104 in the server computer 111c.

The control signal demodulation circuit 1201 in the VTR RF modem 1201 demodulates the control signal and receives the data of channel to be used and the command for start of recording and the modem command processing circuit 1203 commands the video signal demodulator to set the channel and the VTR 114 to record the video signal from the video signal demodulator 1201.

On stopping recording the video signal, the server computer 111c commands the VTR RF modem 115 to stop recording the video signal of the channel in step 2802 with the video recording condition control program 1104 in the server computer 111.

The control signal demodulation circuit 1201 in the VTR RF modem 1201 demodulates the control signal and receives the command for stopping recording and the modem command processing circuit 1203 commands the video signal demodulator to stop recording the video signal from the video signal demodulator 1201.

When a camera from which the video signal to be recorded is sent is changed to another camera, the server computer 111c requests the VTR RF modem 115 to stop recording in step 2901. Then, the server computer 111c requests a camera RF modem of the camera to be coupled the VTR 114 to change the channel to the channel selected by the VTR RF modem 115 with a synchronizing operation. In the following step 2903, the server computer 111c request the VTR modem 115 to start recording with the synchronizing operation. Then, the camera RF modem 103 of the camera to be coupled the VTR 114 changes the channel to the channel selected by the VTR RF modem 115 in response to the synchronizing signal and the VTR modem 115 also starts recording in response to the synchronizing signal from the synchronizing signal receiving circuit. Therefore, the camera RF modem of the camera to be coupled the VTR 114 changes the channel to the channel selected by the VTR RF modem 115 and the VTR modem 115 starts recording at the same time in response to the synchronizing signal as the synchronizing operation.

As mentioned, according to the fourth embodiment, the connection control program 201 and the video signal recording condition control program provides the controlling of the VTR with the synchronizing operation, so that a necessary video image can be recorded efficiently without a disturbance of image on the reproduced image. The VTR may be replaced by a photo-electro-magnetic disc recording unit or the like.

A fifth embodiment will be described.

Figure 13:
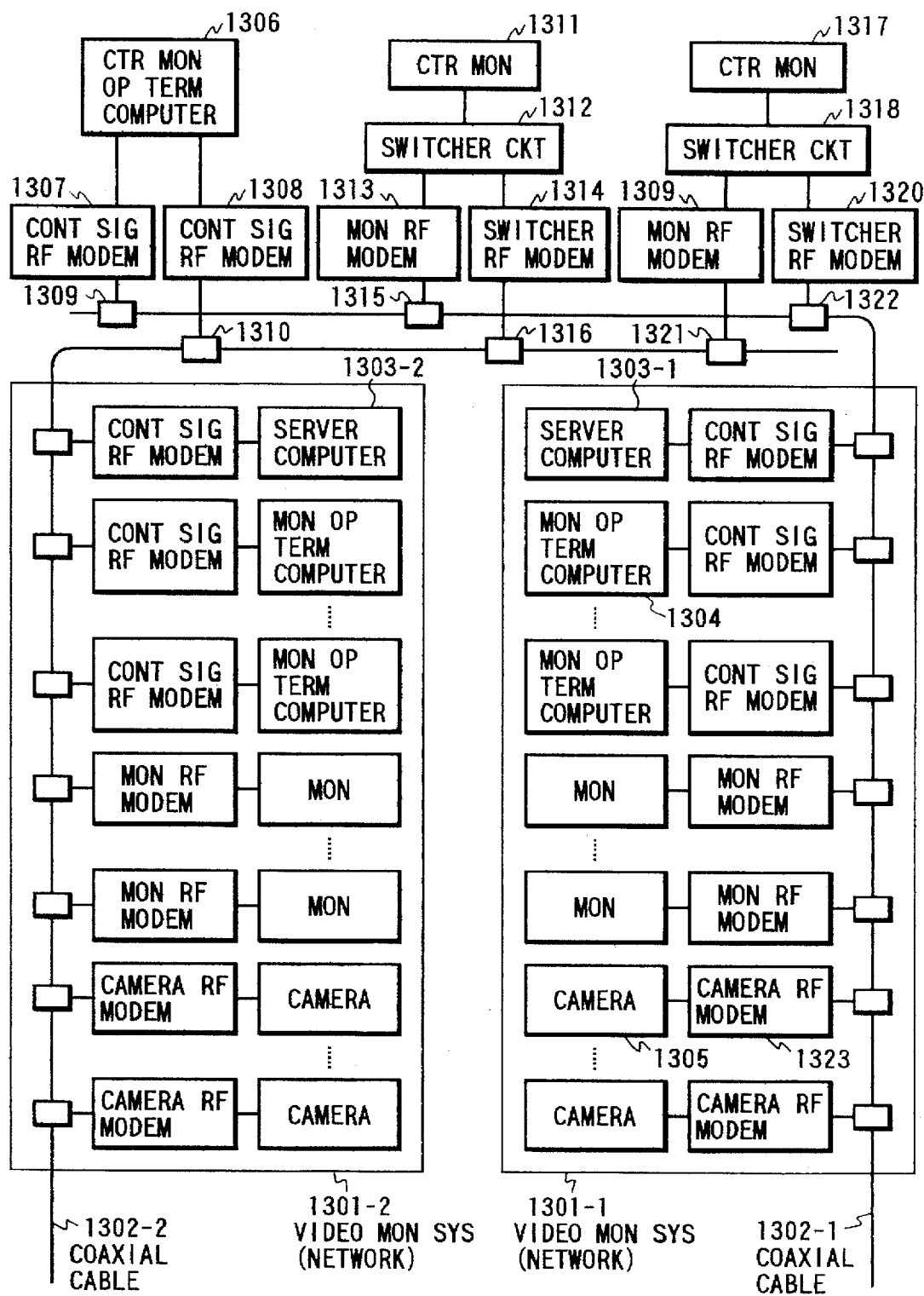
FIG. 13 is a block diagram of a video monitor system of the fifth embodiment.
Figure 14:
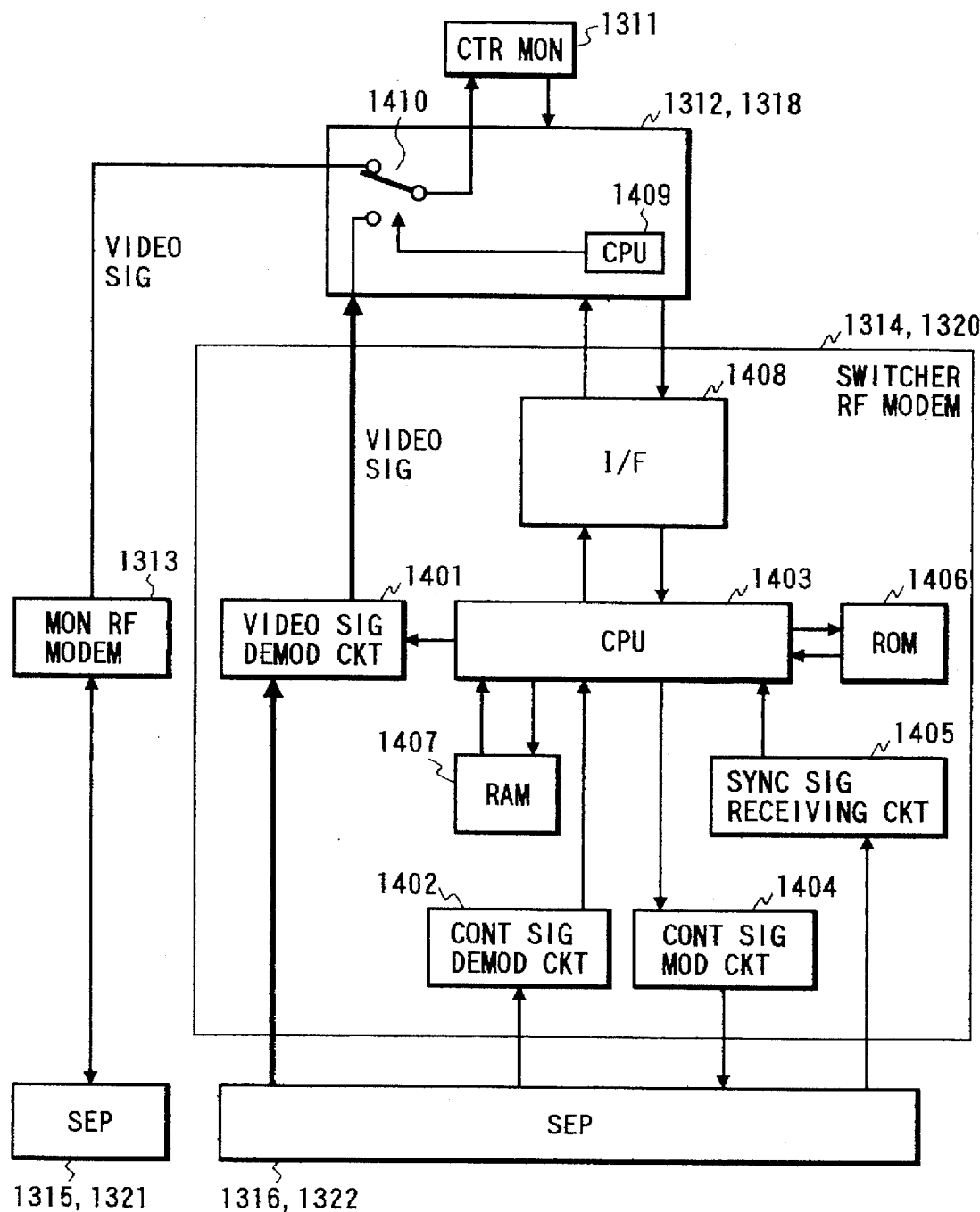
FIG. 14 is a block diagram of a set of center monitor of fifth embodiment.
Figure 15:
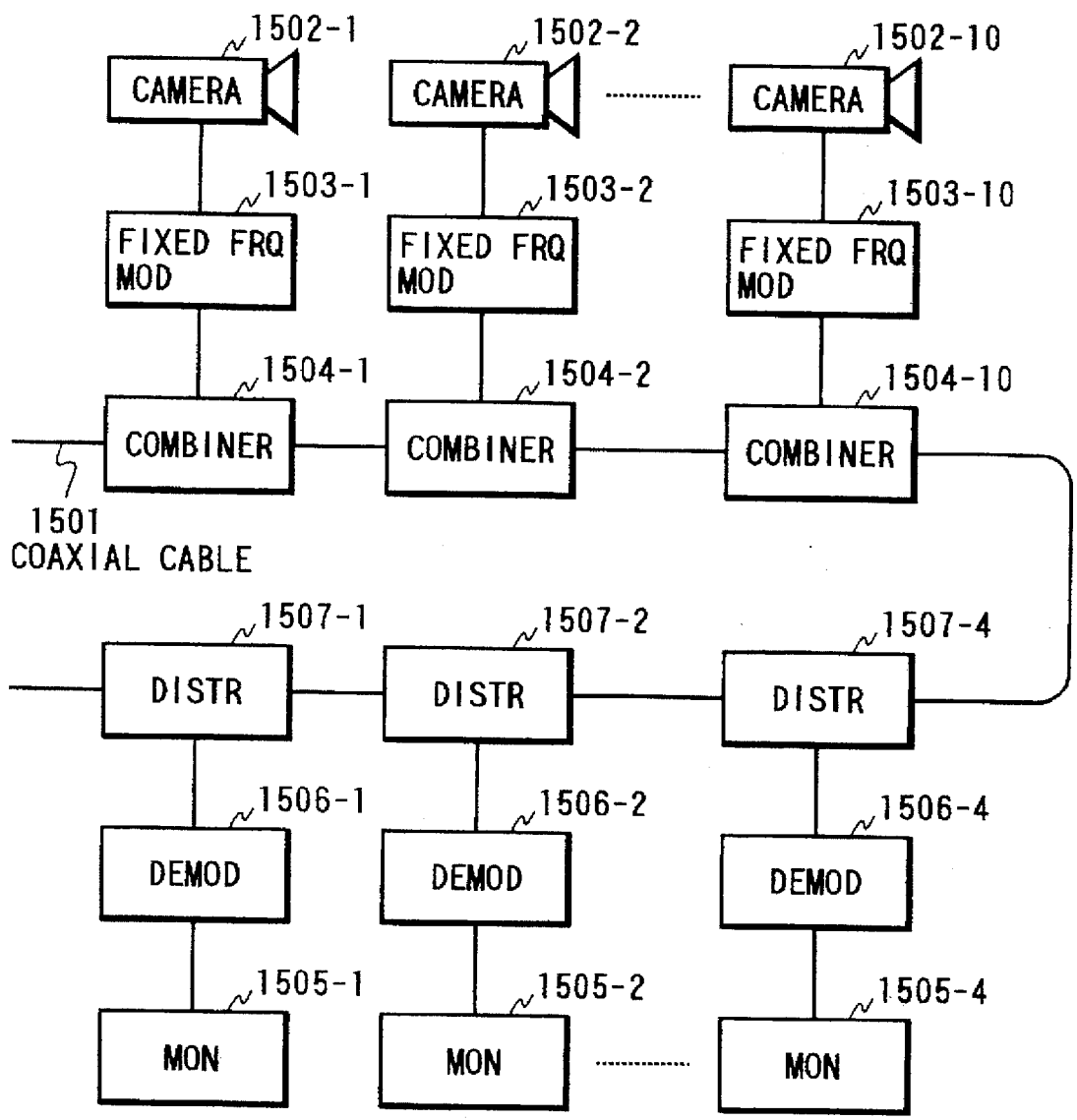
FIG. 15 is a block diagram of a prior art video monitor system.
Figure 30:
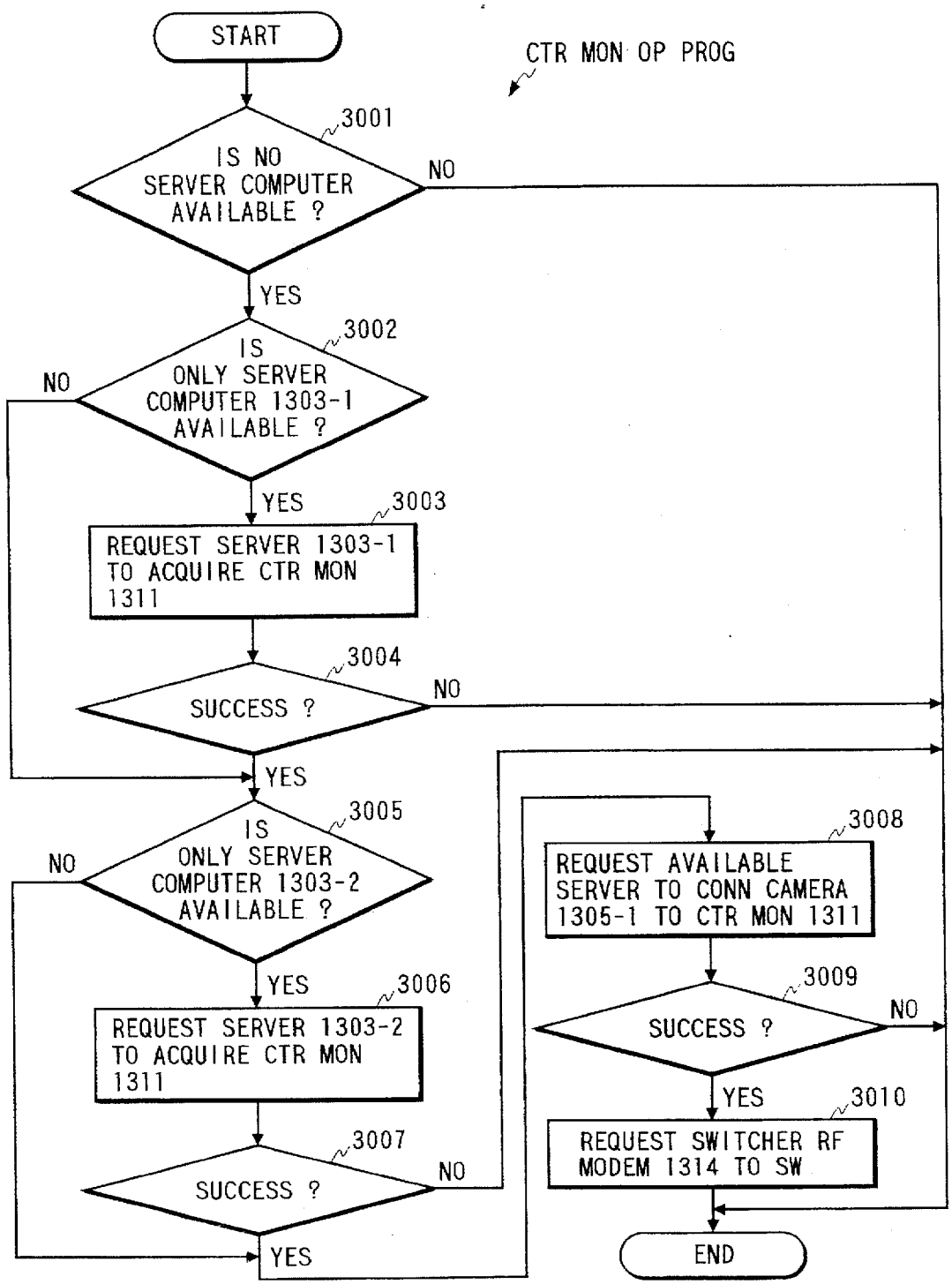
FIG. 30 is a diagram of a flow chart of a center monitor operation program of the fifth embodiment.
Figure 31:
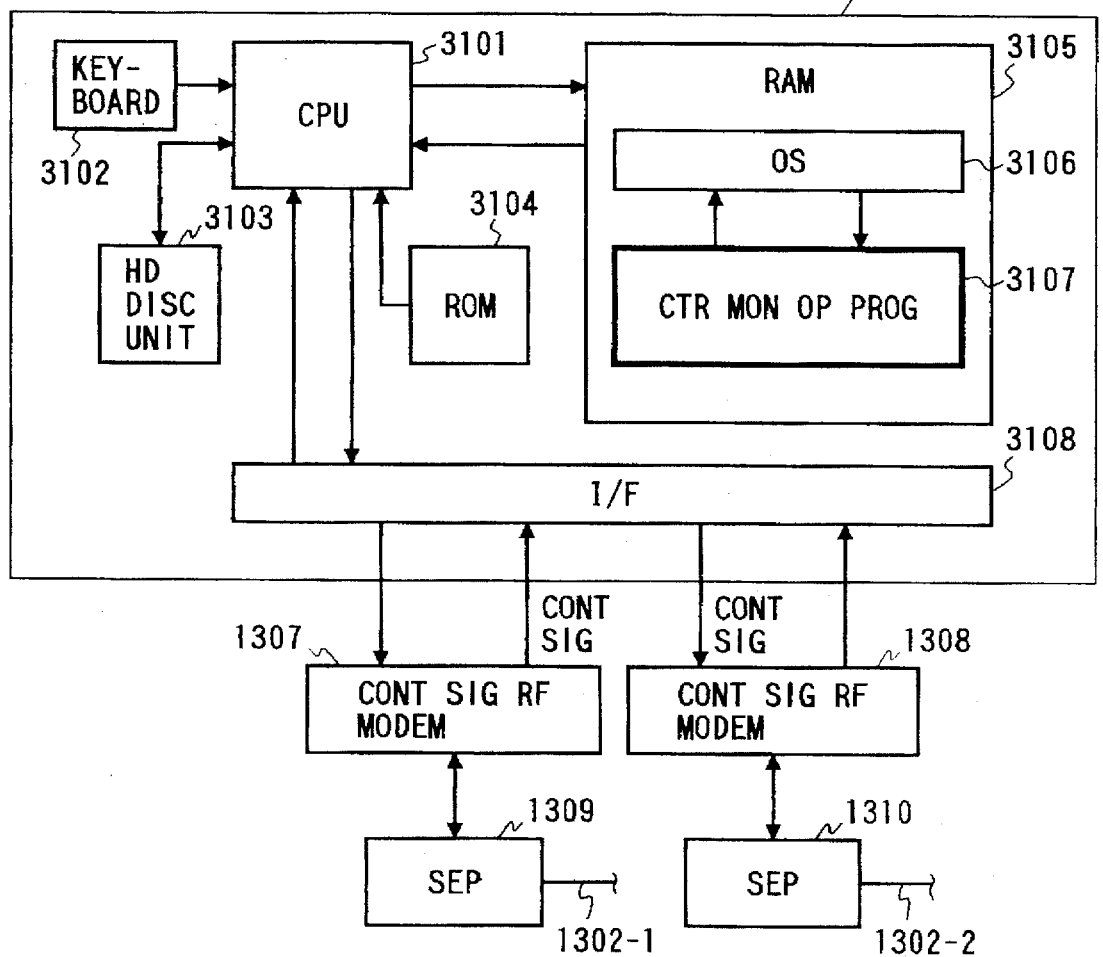
FIG. 31 is a block diagram of a center monitor operation terminal computer in FIG. 13 of the fifth embodiment.
Figure 32:
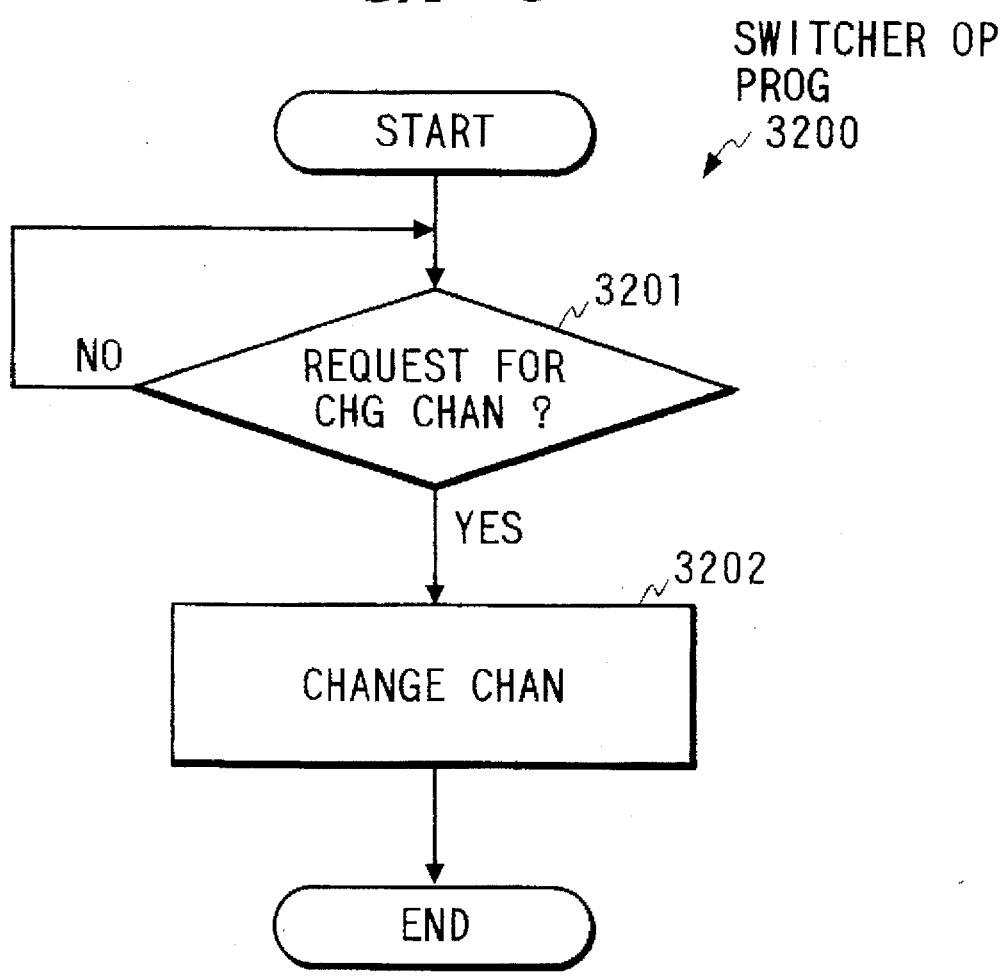
FIG. 32 is a diagram of a flow chart of a switcher circuit in FIG. 13 of the fifth embodiment.

FIG. 13 is a block diagram of a video monitor system of the fifth embodiment. FIG. 14 is a block diagram of a set of center monitor of fifth embodiment. FIG. 30 is a diagram of a flow chart of a center monitor operation program of the fifth embodiment. FIG. 31 is a block diagram of a center monitor operation terminal computer 1306 shown in FIG. 13. FIG. 32 is a diagram of a flow chart of a switcher circuit shown in FIG. 13.

The video monitor system of the fifth embodiment comprises a plurality of video monitor networks, at least a center monitor set, and a center monitor operation terminal computer set. Each of the video monitor networks correspond to the video monitor system of the first embodiment shown in FIG. 1. FIG. 31 is a block diagram of the center monitor operation terminal set including a center monitor operation terminal computer 1306, control signal RF modems 1307 for communicating with the coaxial cable 1302-1 of the video monitor system 1301-1, and a control signal RF modem 1308 for communicating with the a coaxial cable 1302-2 of the video monitor system 1301-2.

The basic structure of the center monitor operation terminal computer 1306 is similar to that of the monitor operation terminal computer 108 shown in FIG. 3. A different is in that a center monitor operation program is stored in the hard disc unit 3103 which is transferred to the RAM 3105 at an initializing.

The switcher RF modem 1314 or 1320 comprises a video signal demodulation circuit 1401 for demodulating the RF video signal having a carrier frequency which can be changed into a baseband video signal and sending the demodulated video signal to the switcher circuit 1312 or 1318, a control signal demodulation circuit 1402 for demodulating a control signal having the predetermined carrier frequency from the bi-directional separator 1316 or 1322, a cpu 1403 for effecting predetermined operations in accordance with the control signal demodulated by the control signal demodulation circuit 1402 and sending a control signal from the monitor 1311, an interface circuit 1408 for interfacing between the switcher circuit 1312 or 1318 and the cpu 1403, a RAM 1407, a ROM 1406, a control signal modulation circuit 1404, and a synchronizing signal receiving circuit 1405 for receiving a synchronizing signal transmitted on the coaxial cable 1302-1. The cpu 1403 effects the operations such as a control of turn-ON or turn OFF of the carrier signal in the video demodulation circuit 1401, a control of changing the modulation frequency, outputting the control signal from the monitor 1405, and changing a switch 1410 in the switcher circuit 1312 or 1320. The channel of the switcher circuit is changed in accordance with the control signal from the switcher RF modulation modems 1314 or 1320.

The cpu 1403 receives the control signal from the bi-directional separator 1316, 1322, the control signal from the switcher circuit 1312, 1318, and the synchronizing signal from the synchronizing signal receiving circuit 1405 by interruption processings.

When the cpu 1403 detects the control signal from the bi-directional separator 1316, 1322, the cpu 1403 executes a program stored in the ROM 1406 as shown in FIG. 31 as similar to the monitor RF modem 106. However, processings executed in response to commands directed to this switcher RF modem 1314 or 1320 stored in the ROM 1406 is such as a processing of switching to the switcher circuit 1312, 1318 which is specially provided to the switcher RF modem 1314 or 1320.

Moreover, when the cpu 1403 detects a control signal from the switcher 1312, 1318, the cpu 1403 executes the program stored in the ROM 1406 as shown in FIG. 33 as similar to the camera RF modem 103.

Moreover, the synchronizing signal is used in the cpu 1403 to execute a processing requiring a synchronizing operation in the network of the video monitor system.

The center monitor operation terminal computer 1306 executes the center monitor operation program 3107 in response to a command from a key board 3102 for example as follows:

In this embodiment, the center monitors 1311 and 1317 are controlled under both server computer 1303-1 and 1303-2. That is, a connection condition cannot be changed if both server computers 1303-1 and 1303-2 do not allow to change the connection condition. However, if either of the server computers is failure, the connection condition can be changed by only the other server computer.

In step 3001, a decision is made as to whether no server computer is available. If no server computer available, processing ends. If at least a server computer is available, processing proceeds to step 3002. In step 3002, a decision is made as to whether the server computer 1303-1 is available. If NO, processing proceeds to step 3005. If only the server computer 1303-1 is available, the center monitor operation terminal computer 1306 requests the server computer 1303-1 to acquire the center monitor 1311. If the server computer 1303-1 successes in acquiring the center monitor 1311, processing proceeds to step 3005. If NO, processing ends.

In step 3005, a decision is made as to whether the server computer 1303-2 is available. If NO, processing ends. If only the server computer 1303-2 is available, the center monitor operation terminal computer 1306 requests the server computer 1303-2 to acquire the center monitor 1311. If the server computer 1303-2 succeeds in acquiring the center monitor 1311, processing proceeds to step 3008. If NO, processing ends.

In step 3008, the center monitor operation terminal computer 1306 requests the available server computer 1303-1 or 1303-2 to connect a camera 1305-1 to the center monitor 1311. If the center monitor operation terminal computer 1306 succeeds, the center monitor operation terminal computer 1306 requests the switcher RF modem 1314 to change the channel to the side of the video monitor network 1301-1 in step 3010.

The server computer 1303-1, the monitor RF modem 1313, the camera RF modem change the connection condition as similar to the first embodiment. In steps 3201 and 3202, the switcher circuit 1312 changes the channel to the monitor RF modem 1313 in response to the request in step 3010 from the center monitor operation terminal computer 1306.

In the flow chart shown in FIG. 30, if both are trouble in step 3001, the center monitor operation computer fails in acquisition of the center monitor 1311. In this example shown in FIG. 13, if there is a trouble in either of server computer and there is a request for using a camera under control of this server computer, the camera cannot be controlled and this connection results in fail.

As mentioned above, according to the large-scale video monitor system of this embodiment, the operation to the center monitor operation terminal computer 1306 selectively provides a video image from a plurality of video monitor systems (networks). Moreover, the server computers are provided to respective networks, so that a trouble in one network does not affect to monitoring in the other network.

According to embodiments as mentioned, it is possible to provide cameras and monitors of which number is larger than the number of the channels of the cable. Moreover, if there is a collision between requests for one camera, the requests can be processed in accordance with the priority assigned to the monitors. Moreover, a trouble in the modem or the network can be detected. Further, a predetermined operation can be effected in response to an alarm or a timer and the operation can be restored after a predetermined interval. Moreover, the sequence operation can be provided and a video signal can be recorded efficiently. Further, the large-scale video monitor system including a plurality of video monitor systems can be provided.

What is claimed is:

1. A video monitor system comprising: transmission medium means, having L channels of L video signals for transmitting said L video signals and data;

a video signal source portion including M video signal source units each of said M video signal source units receiving said data from said transmission medium means and selectively generating and suppling one of said L video signals to said transmission medium means through one of said L channels in accordance with said data, a monitor portion including; N monitor units, each of said N monitor units receiving said data from said transmission medium means and selectively receiving and reproducing one of said L video signals from one of said L channels in accordance with said data, said L, M, and N being natural number more than one;

a monitor control portion including a plurality of monitor control terminals, each of said monitor control terminals operating in response to a request, to generate and transmit to said transmission medium means said data indicating which one of said M video signal sources is requested to be operated and said data indicating which one of said N monitor units is requested to be operated; and a control portion including receiving means for receiving all said data from said monitor control portion via said transmission medium means, channel condition detection means responsive to said data indicating which one of said M video signal sources is requested to be operated and said data indicating which one of said N monitor units is requested to be operated for detecting a condition of said L channels, determining means responsive to said channel condition detection means for determining one of said L channels to be used in accordance with said detected condition of said L channels and operating means, responsive to said data indicating which one of said M video signal sources is requested to be operated and said data indicated by said data from said monitor control terminal portion to supply said one of L video signals using said determined one of L channels to said one of said N monitor units indicated by said data from said monitor control terminal portion to receive and reproduce said one of L video signals from the determined one of the L channels.

2. A video monitor system as claimed in claim 1, wherein said M video source units, said N monitor units, and said monitor control terminals have addresses respectively and said control portion transmits data directed to said more than one of said addresses at once.

3. A video monitor system as claimed in claim 1, comprising synchronizing signal generation means for generating a synchronizing signal, wherein said transmission medium means further transmits said synchronizing signal and said M video source units and N monitor units further comprise synchronizing signal receiving means respectively, each of said M signal source units selectively generates and supplies one of said L video signals to said transmission medium means in response to said synchronizing signal from said synchronizing signal receiving means, and each of said N monitor units selectively receives one of said L video signals in response to said synchronizing signal from said synchronizing signal receiving means thereof.

4. A video monitor system as claimed in claim 1, wherein each of said monitor control terminals further comprises first generating and transmitting means responsive to a acquiring request for generating data indicative of acquiring a right of controlling a desired one of said M video signal sources to said control portion and second generating and transmitting means responsive to a releasing request for generating said data indicative of releasing said right of controlling said desired one of said M video signal sources to said control portion, said control portion further includes priority data storing means for storing priority data of said M video signal sources and judging means for, when said receiving means of said control portion receives said data indicative of acquiring said right of controlling said desired one of said M video signal sources from one of said N monitor terminal in the case that said receiving means of said control portion has received said data indicative of acquiring said right of controlling said desired one of said M video signal sources from another one of said N monitor control terminals and has not received said data indicative of releasing said right from another one of said N monitor control terminal, judging which one of said one or said another one of said N monitor control terminals has a higher priority in accordance with said priority data, and transmits said data indicative of providing said right of controlling said desired one of said M video signal sources to either one of said N monitor control terminals which has been judged to have said higher priority.

5. A video monitor system as claimed in claim 1, wherein said M video signal sources comprise video camera for taking a picture and generating said video signal in accordance with a picture.

6. A video monitor system as claimed in claim 1, wherein said control portion further comprises generating means response to a response request command for generating said data indicative of said response requesting command, said transmitting means transmits said data indicative of said response requesting command to at least one of said M video signal sources and said N monitor terminals and said at least one of said M video signal sources and said N monitor terminals receives said data indicative of said response requesting command and generates and transmits said data indicative of said response responsive to said response requesting command to said control portion, and said control portion further comprises judging means for judging a condition of said transmitting medium from said data indicative of said response received by said receiving means.

7. A video monitor system as claimed in claim 6, wherein said M video sources and said N monitor units have addresses respectively and said control portion further includes address storing portion means for storing address data of said M video sources and said N monitor units, said at least one of said M video signal sources and said N monitor terminals receiving said data indicative of said response requesting command generates and transmits said data indicative of a response to said response requesting command with information of said address thereof to said control portion, and said judging means further includes detection means for detecting a location of a defect in said transmitting medium from said address data in said address data storing means and said information of said address in said data which could be received by said receiving means.

8. A video monitor system as claimed in claim 5, wherein each of M said video signal sources further comprises alarm signal detection means for detecting an alarm signal and generating and transmitting said data indicative of said alarm signal, said control portion further includes alarm operation means for executing a predetermined alarm operation in a first condition of said M video signal sources and said N monitor units in response to said data indicative of said alarm signal, timer means for detecting a timing when a preset time has come, timer operation means for executing a predetermined timer operation in a second condition of said M video signal sources and said N monitor units in response to said timer operation means, condition detection and storing means responsive to said data indicative of said alarm signal from said receiving means and said timer means for detecting a condition of said M video signal sources and said N monitor units and for storing data of said condition, completion detection means for detecting completion of said alarm operation and predetermined timer operation, and restoring means responsive to said completion detection means for operating said video signal source portion and said monitor portion in accordance with said data of said detected condition.

9. A video monitor system as claimed in claim 5, wherein said control portion further includes sequence control means responsive to a sequence operation request for generating and transmitting said data indicative of a sequence of operations of more than one of said M video signal sources and said N monitor units to said more than one of M video signal sources and said N monitor units respectively and start timing generation means responsive to a sequence operation start command for generating said data indicative of a start timing, and said each of M video signal sources and said N monitor units further comprises sequence storing means for storing said data indicative of said sequence, and said more than one of M video signal sources and said N monitor units which have received said data indicative of said sequence executes said sequence of operations execute said sequence of operations when they receive said data indicative of start timing.

10. A video monitor system as claimed in claim 9, wherein further comprising synchronizing signal generation means for generating a synchronizing signal, wherein said transmitting medium means transmits said synchronizing signal and said M video source units and N monitor units have synchronizing signal receiving means respectively, and said more than one of M video signal sources and said N monitor units which have received said data indicative of said sequence execute said sequence of operations in response to said received synchronizing signal.

11. A video monitor system as claimed in claim 1, further comprising recording means for receiving said data from said generating means through transmission medium means and selectively receiving and recording one of said L video signals in accordance with said data using one of said L channels, wherein said control portion further comprises recording operation means responsive to data indicative of said recording request and said determining means for operating one of said M video signal sources in accordance with said data indicative of said recording request using the determined one of said L channel.

12. A video monitor system comprising:
a plurality of networks, each comprising:
transmission medium means, having L channels arranged to transmit L video signals, for transmitting data;
a video signal source portion including M video signal source units, each of said video signal source units receiving said data from said transmission medium means using one of said L channels in accordance with said data;
a monitor portion including; N monitor units, each of said monitor units receiving said data from said transmission medium means and selectively receiving and reproducing one of said L video signals from one of said L channels in accordance with said data, where L, M, and N are natural numbers greater than one;
a monitor control portion including a plurality of monitor control terminals, each of said monitor control terminals in response to a request, generating and transmitting data indicating which one of said M video signal sources is requested to be operated, and which one of said N monitor units is requested to be operated, to said transmitting medium; and
a control portion including receiving means for receiving data from said monitor control portion via said transmission medium means, channel control means for detecting used and unused conditions of said L channels of paths and storing said channel control data determining means for determining which one of said L channels is used in accordance with said channel control data in response to said data from said monitor control position via said receiving means operating means, responsive to said data indicating which one of said M video signal sources is requested to be operated and said data indicating which one of said N monitor units is requested to be operated, for operating said one of M video signal sources indicated by said data from said monitor control terminal portion to supply said one of L video signals using the determined one of L channels and operating said one of said N monitor units indicated by said data from said monitor control terminal portion to receive and reproduce said one of L video signals from the determined one of L channels through generating and transmitting said data to said transmitting medium;
a center monitor control terminal, communicating with said control portions of said plurality of network, for, in response to a monitoring request, determining which of said plurality of networks is requested in accordance with said monitoring request, generating and transmitting said data indicating which one of said M video signal sources of said determined network is requested to be operated to said control portion of the determined network;

switching means, connected to said transmitting mediums of said plurality of networks, for selectively supplying said one of said M video signals corresponding to said monitoring request from the determined network; and at least a center monitor unit for producing said one of video signals from said switching means based upon at least two control portions of said plurality of networks.

13. A video monitor system as claimed in claim 11, further comprising synchronizing signal generation means for generating a synchronizing signal, wherein said transmitting medium means transmits said synchronizing signal and said recording means has synchronizing signal receiving means for receiving said synchronizing signal and said recording means recording said received one of said L video signal in response to said synchronizing signal from said synchronizing signal receiving means.

14. A video monitor system as claimed in claim 1, wherein said L<M.

15. A video monitor system as claimed in claim 1, wherein said L<N.

16. A video monitor system as claimed in claim 5, wherein said control portion further includes conditional data storing means for storing predetermined conditional data, condition detection and storing means responsive to a mode change command for detecting a condition of said M video signal sources and said N monitor units and storing data of said detected condition, mode changing means responsive to said detection means for operating said video signal source portion and said monitor portion in accordance with predetermined conditional data, and restoring means responsive to a mode restoring command for operating said video signal source portion and said monitor portion in accordance with said data of said detected condition.

17. A video monitor system as claimed in claim 16, wherein said each of M video signal source units includes an alarm signal detection means for detecting an alarm signal and transmitting said data indicative of detecting said alarm signal and said receiving means generates said mode change command when said data indicative of detecting an alarm signal.

18. A video monitor system as claimed in claim 16, wherein said control portion further includes timer means for detecting a timing when a preset time has come and said control portion generates said mode change command when said timer means detects said timing.

19. A video monitor system as claimed in claim 1, wherein each of said M video signal source units, each of said N monitor units, each of said plurality of monitor control terminals, and a control portion comprises means for providing coupling to said transmission medium.

20. A video monitor system as claimed in claim 1, wherein each of said M video signal source units, each of said N monitor units, each of said plurality of monitor control terminals, and a control portion are mixedly arranged with respect to said transmission medium.

21. A video monitor system as claimed in claim 13, wherein said transmitting means transmits said synchronizing signal in one of said L channels together with said data.

* * * * *